United States Patent
De Bruijn

(10) Patent No.: US 9,929,808 B2
(45) Date of Patent: Mar. 27, 2018

(54) HIGH-DYNAMIC-RANGE CODED LIGHT DETECTION

(71) Applicant: PHILIPS LIGHTING HOLDING B.V., Eindhoven (NL)

(72) Inventor: Frederik Jan De Bruijn, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/319,741

(22) PCT Filed: May 18, 2015

(86) PCT No.: PCT/EP2015/060907
§ 371 (c)(1),
(2) Date: Dec. 16, 2016

(87) PCT Pub. No.: WO2015/193042
PCT Pub. Date: Dec. 23, 2015

(65) Prior Publication Data
US 2017/0141847 A1    May 18, 2017

(30) Foreign Application Priority Data

Jun. 19, 2014  (EP) ..................................... 14173164

(51) Int. Cl.
*H04B 10/116*   (2013.01)
*H05B 37/02*    (2006.01)

(52) U.S. Cl.
CPC ....... *H04B 10/116* (2013.01); *H05B 37/0272* (2013.01)

(58) Field of Classification Search
CPC ......................... H04B 10/116; H05B 37/0272
(Continued)

(56) References Cited

U.S. PATENT DOCUMENTS

| 5,305,033 A | 4/1994 | Takahashi et al. |
| 6,147,760 A | 11/2000 | Geng |

(Continued)

FOREIGN PATENT DOCUMENTS

| DE | 10200703177 A1 | 1/2009 |
| EP | 2503852 A1 | 9/2012 |

(Continued)

*Primary Examiner* — Dalzid Singh

(57) ABSTRACT

The invention relates to a method for determining data embedded into a light output of a light source (121, 122) with an image acquisition device (140, 210) comprising at least a first color channel (212) and a second color channel (214). The method includes adjusting an initial gain of the first color channel (212) and/or an initial gain of the second color channel (214) so that the distribution of a histogram of pixel values for the first color channel (212) is substantially different from the distribution of a histogram of pixel values for the second color channel (214) according to one or more measures of distribution, obtaining one or more images of a scene acquired with the image acquisition device (140, 210) configured with the adjusted gains for the first and second color channels, the scene containing the light output of the light source, and processing at least some of the pixel values of the acquired images to determine the embedded data.

15 Claims, 12 Drawing Sheets

(58) Field of Classification Search
USPC .......................................................... 398/118
See application file for complete search history.

(56) References Cited

U.S. PATENT DOCUMENTS

| | | | |
|---|---|---|---|
| 6,271,940 B1 * | 8/2001 | Deschuytere | H04N 1/6033 |
| | | | 358/504 |
| 8,248,467 B1 | 8/2012 | Ganick et al. | |
| 2006/0067707 A1 | 3/2006 | Maniam et al. | |
| 2006/0203311 A1 * | 9/2006 | Weng | H04N 1/6027 |
| | | | 358/516 |
| 2010/0215378 A1 | 8/2010 | Rajagopal et al. | |
| 2012/0105672 A1 * | 5/2012 | Doepke | H04N 5/2351 |
| | | | 348/229.1 |
| 2012/0281879 A1 * | 11/2012 | Vlutters | G06K 9/2036 |
| | | | 382/103 |
| 2013/0026224 A1 | 1/2013 | Ganick et al. | |
| 2013/0222582 A1 | 8/2013 | Mohan et al. | |
| 2013/0307931 A1 | 11/2013 | Bronstein et al. | |

FOREIGN PATENT DOCUMENTS

| | | |
|---|---|---|
| WO | 2011086501 A1 | 7/2011 |
| WO | 2012127439 A1 | 9/2012 |
| WO | 2013108146 A1 | 7/2013 |

* cited by examiner

HIGH-DYNAMIC-RANGE CODED LIGHT DETECTION

CROSS-REFERENCE TO PRIOR APPLICATIONS

This application is the U.S. National Phase application under 35 U.S.C. § 371 of International Application No. PCT/EP2015/060907, filed on May 18, 2015, which claims the benefit of European Patent Application No. 14173164.6, filed on Jun. 19, 2014. These applications are hereby incorporated by reference herein.

FIELD OF THE INVENTION

Embodiments of the present invention relate generally to the field of illumination systems and optical receivers, and, more specifically, to systems and methods for determining data embedded into a light output of a light source with an image acquisition device comprising at least two color channels.

DESCRIPTION OF THE RELATED ART

In recent years, highly advanced illumination systems are being developed that allow consumers to obtain a desired ambiance for a particular room or space. These illumination systems move away from the traditional control of individual light sources (switching on/off and dimming) to scene setting, where sets of light sources are controlled simultaneously. An example of such an illumination system is an arrangement of several sets of light sources in a room, a lobby or a vehicle.

For these scene setting applications, intuitive user interaction is identified as one of the most important success factors. Providing a user with information related to the light sources, such as localized identification of the light sources, their capabilities and current settings, is key for enabling an intuitive interaction. One technique that has been proposed to provide the user with such information is based on embedding data, such as e.g. identifiers (IDs) identifying a light source or a group of light sources and/or providing information about the light source or its' surrounding, by modulating one or more characteristics of the luminance (light) output of the light source. Since it is the light output of the device(s) that carries the embedded IDs or other data, such a technique has been referred to as "coded light" (CL) technique and such light sources are then referred to as "CL sources."

Various CL techniques for embedding data into the light output of a light source are known in the art. Detection systems are also known where a camera within a detection system is configured to acquire one or more images of a scene, the images containing the light output of the light source, and the images are subsequently processed to detect the modulations and thereby recover the embedded data. The camera may be implemented in a remote control for controlling the light source or included in another unit such as a switch or a sensor device. This technology has also opened up the possibility to use commonly available smartphones and tablets as CL detectors because these days those devices are typically equipped with cameras.

WO2011086501 discloses a CL a detection system for determining whether a light contribution of a light source is present at a selected position within a 2D scene. The light contribution includes an embedded code comprising a repeating sequence of N symbols. The detection system includes a camera and a processing unit. The camera is configured to acquire a series of images of the scene via specific open/closure patterns of the shutter. The processing unit is configured to process the acquired series of images to determine whether the light contribution of the first light source is present at the selected physical position within the scene by e.g. correlating a sequence of pixels of the acquired series corresponding to the selected physical position with the first sequence of N symbols.

However, due to the limitations of the camera, particularly when low-cost tablet or phone cameras are used, it is not always possible to recover the embedded data from the acquired images. One reason for this is that the images may be acquired so that the pixels (i.e., the photo sensors of a camera) relevant for the detection of embedded data (i.e., the pixels from which the embedded data may be recovered) are oversaturated or under-exposed. When this happens, it is impossible to do any CL detection, because oversaturated or under-exposed photo sensors are unable to detect the differences in the received light intensity necessary for determining the embedded CL data.

What is needed in the art is an approach that allows CL detection that reduces or eliminates one or more of these problems.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

To reduce or eliminate at least some of the problems discussed above, according to one aspect of an embodiment of the present invention, a computer-implemented method for determining data embedded into a light output of a light source is disclosed. The data is embedded into the light output as modulations of one or more characteristics of the light output, preferably intensity modulations of the light output. The method relies on the use of an image acquisition device, e.g. a camera, comprising at least a first color channel comprising a plurality of first pixels configured to detect light in a first wavelength range and a second color channel comprising a plurality of second pixels configured to detect light in a second wavelength range, the second wavelength range being different from the first wavelength range. The method includes a step of adjusting an initial gain of the first color channel and/or an initial gain of the second color channel so that the distribution of a histogram of pixel values for the first color channel is substantially different from the distribution of a histogram of pixel values for the second color channel according to one or more measures of distribution. Thus, in this step, the gain setting of at least one but possibly of each of the color channels is adjusted. The method also includes a step obtaining one or more images of a scene acquired with the image acquisition device configured with the adjusted gains for the first and second color channels, the scene containing the light output of the light source. In other words, one or more images of a scene are obtained, the images having been acquired with the adjusted gain settings. The method further includes a step of processing pixel values of at least some of the plurality of first pixels and the plurality of second pixels in the one or more of the acquired images to determine the data embedded into the light output.

The one or more images of the scene acquired with the image acquisition device configured with the adjusted gains for the first and second color channels are referred to hereafter as "modified images" while images of the scene acquired with the image acquisition device configured with the initial gains for the first and second color channels are referred to hereafter as "original images".

As used herein, the term "pixel" refers to a photo sensor of an image acquisition device, e.g. a camera, used to generate an electrical signal, typically a voltage signal, in response to light impinging onto the photoactive material of the photo sensor. The magnitude of the electrical signal generated by the pixel is directly related, e.g. proportional, to the intensity of light impinging on the pixel. The value that the pixel generates/contains as a result of light impinging on the pixel is referred to herein as a "pixel value". Thus, a pixel value is indicative of the intensity of light impinging on a pixel.

A color camera comprises pixels each of which is configured for detecting light of particular spectrum (i.e., of a particular wavelength range). Conventional cameras typically comprise red, green, and blue pixels (RGB) configured to detect light in respective spectral ranges of the electromagnetic energy. As used herein, the term "color channel" refers to a plurality of pixels configured to detect light in a particular wavelength range.

A skilled person will realize that, since the image acquisition device described herein has at least two different color channels, each of the images described in the present application and, in particular, each of the images referred to in the present claims, in fact comprises two images—one acquired via each color channel. In other words, each of the one or more acquired images described herein includes a collection of pixel values as generated/contained by the pixels forming the first color channel (i.e., an image acquired via the first color channel) and a collection of pixel values as generated/contains by the pixels forming the second color channel (i.e., an image acquired via the second color channel). In case there are more than one image in the "one or more acquired images", these images refer to images of a scene acquired sequentially, as may be necessary for some CL detection methods.

As used herein, the expression "adjusted gain" is used to describe a gain of a particular color channel following the step of adjusting the initial gain of at least one but possibly more of the color channels of the image acquisition device. Thus, even if a gain of a particular channel was not changed from the initial gain in the step of adjusting, the gain of this channel is still referred to as an "adjusted gain", where it is understood that the adjustment in such a case was a zero adjustment and the adjusted gain is equal to the initial gain. The expression "gain setting" is used to describe a collection of gain values for each of the color channels of the image acquisition device.

As used herein, the term "histogram" has its usual meaning of being a graphical representation of the frequency distribution of data, in this context—of pixel values. Thus, in the context of the present application, the x-axis of a histogram plots the pixel values, while the y-axis plots a frequency or count of the occurrences that a particular pixel value occurs or may occur.

Automatic white-balancing algorithms are typically employed in cameras in order to produce proper color rendering for a hypothetical "grey world" so that a natural white-balance is achieved under all lighting conditions (e.g. direct sunlight, incandescent or fluorescent lamps). Such algorithms generally tend to adjust the gains of the individual color channels (typically, red, green, and blue channels) until the histograms of their respective pixel values overlap. Embodiments of the present invention are based on the realization that, in most cases, functional illumination tends to be white such that all color channels tend to adopt the same pixel value when the camera is aimed at the light, which means that all of the different color channels tend to clip in the same over- or under-exposed regions such that the CL modulation is lost simultaneously for all of the color channels.

Embodiments of the present invention are further based on the realization that adjusting the gains of the different color channels of an image acquisition device so that the distributions of the histograms of pixel values for the different color channel are substantially different from the distribution of a histogram of pixel values for the second color channel can essentially act as setting a separate ISO for each channel. Thus, instead of optimizing the gains of the different color channels for aesthetics (e.g. optimized for obtaining particular image quality or aesthetic effect), according to embodiments of the present invention the gains of the different color channels are optimized for CL detection. By intentionally setting the gain values of the different color channels so that the histograms each occupy another region of the pixel value range, each color channel may be adapted to capture a different part of the dynamic range of light intensities, thereby minimizing or even eliminating situations where clipping of the same pixels values occurs simultaneously across all color channels. In this manner, embodiments of the present invention allow carrying out CL detection across higher dynamic range of intensities (pixel values) than is currently done in the state of the art.

In an embodiment, in addition to acquiring the modified images, the method may include obtaining one or more of the original images of the scene (i.e., images acquired with the image acquisition device configured with the initial gains for the first and second color channels. Such an embodiment allows detection of CL light from the modified images, while, at the same time, securing that the original images are acquired as well—e.g. for the purpose of displaying them for a user. The latter may be advantageous because it would eliminate the need for performing post-processing of the modified images to re-create the original images.

In an embodiment, the one or more measures of the distribution could include the dispersion of the distribution, where the initial gain of the first color channel and/or the initial gain of the second color channel are adjusted so that the dispersion of the histogram of pixel values for the first color channel is substantially different from the dispersion of the histogram of pixel values for the second color channel according to one or more measures of dispersion. In various further embodiments, the one or more measures of dispersion could be selected from the group of variance, standard deviation, and interquartile range.

In an embodiment, the step of processing the pixel values to determine the data embedded into the light output could include identifying one or more areas within the one or more of the acquired images to be used for detecting the data embedded into the light output of the light source and selecting first pixels and second pixels, from, respectively, the plurality of first pixels (i.e., selecting pixels forming the first color channel) and the plurality of second pixels (i.e., selecting pixels forming the second color channel), that correspond to the identified one or more areas. Each selected first pixel corresponds to a different position or a point within the identified one or more areas, and each selected second pixel corresponds to a different position or a point within the identified one or more areas. The method further includes either one or both of the following set of steps. In one set of steps, the method includes identifying first pixels, within the selected first pixels, that contain pixel values, in the one or more of the acquired images, which are not suitable for the detection of the data embedded into the light output of the light source and, for each of the identified first pixels, identifying a second pixel, within the plurality of second pixels, that corresponds to substantially the same position within the identified one or more areas as the identified first pixel and using a pixel value of the identified second pixel while preferably not using a pixel value of the identified first pixel for the determination of the data embedded into the light output of the light source. In the other set of steps (i.e., either additionally or alternatively to the first set of steps), the method includes identifying second pixels, within the selected second pixels, that contain pixel values, in the one or more of the acquired images, which are not suitable for the detection of the data embedded into the light output of the light source and, for each of the identified second pixels, identifying a first pixel, within the plurality of first pixels, that corresponds to substantially the same specific position within the identified one or more areas as the identified first pixel and using a pixel value of the identified first pixel while preferably not using a pixel value of the identified second pixel for the determination of the data embedded into the light output of the light source.

In another embodiment, the step of processing the pixel values to determine the data embedded into the light output may include selecting pixels, from the plurality of first pixels (i.e., selecting pixels forming the first color channel) and the plurality of second pixels (i.e., selecting pixels forming the first color channel) to be used for detecting the data embedded into the light output of the light source, determining whether any of the selected pixels are not suitable for the detection of the data embedded into the light output of the light source, and determining the data embedded into the light output by only processing pixel values in the one or more of the acquired images of the selected pixels for which it was not determined that the pixels are not suitable for the detection. Selecting particular pixels of the image acquisition device corresponds to identifying a subarea within the acquired images suitable for detecting the data embedded into the light output of the light source. For example, it may be known where in the image the light footprint or a halo of a particular light source will be located. Since some CL detection methods are specifically tailored to determining CL data from the light footprint or the halo of the light source, in order to implement those detection methods pixels corresponding to these areas of the one or more acquired images are selected to be used for CL detection. Subsequently determining whether any of the selected pixels are not suitable for CL detection because they are e.g. over- or under-exposed, allows discarding those pixels values and processing only the pixels values of which are suitable.

In an embodiment, the method may further include obtaining one or more images of the scene acquired with the image acquisition device configured with the initial gains for the first and second color channels (i.e., the original images) and determining pixel values of pixels, from the plurality of first pixels and the plurality of second pixels, to be used for detecting the data embedded into the light output of the light source within the original images, where the initial gain of the first color channel and/or the initial gain of the second color channel are adjusted based on the determined pixel values. In this embodiment, the pixels to be used for detection of CL data may be identified as described e.g. for "selecting pixels". This embodiment provides the advantage that the initial gain setting is adjusted in view of the measured light intensities as detected by relevant pixels in a particular environment (i.e., with particular lighting conditions and with the image acquisition device configured in a particular manner e.g. in terms of shutter/diaphragm setting). In a further embodiment, it is possible that the method includes processing, or attempting to process, the pixel values within the original images to determine the data embedded into the light output. When the detection of CL light from the original images appears to be sub-optimal or even impossible because some of the pixels necessary for the detection are over- or under-exposed, the initial gains of the first and/or second color channels can be adjusted accordingly (i.e. to minimize the over-/under-exposure across the entire range of pixel values).

In one embodiment, the step of adjusting the initial gain of the first color channel and/or the initial gain of the second color channel may comprise decreasing a gain value of the initial gain, to some non-zero value, of either the first color channel or the second color channel so that, for the color channel for which the gain value is being decreased, the number of pixels that are over-exposed (i.e. pixels containing pixel values that are clipped to the maximum pixel value) in at least one image acquired under the initial gain decreases to be equal to or below a predefined so-called "overexposure threshold" in at least one image acquired under the adjusted gain. The latter image could be but does not have to be one of the modified images from which the data embedded into the light output is actually determined. In other words, the gain of one of the channels may be decreased so that the number of over-exposed pixels in an image of a scene acquired with the image acquisition device configured with the initial gain for that channel is decreased to be equal to or below the predefined overexposure threshold in an image of a scene acquired with the image acquisition device configured with the adjusted gain for that channel. In this manner, at least some of the pixel values that were previously clipped to the maximum pixel value of the pixel value range, e.g. to the value of 255 when the pixel value range is 0-255, are no longer clipped and it is possible to detect CL from at least some of those pixels.

Alternative to the embodiment of decreasing the gain as described above, in an embodiment, the step of adjusting the initial gain of the first color channel and/or the initial gain of the second color channel could comprise decreasing a gain value of the initial gain, to some non-zero value, of either the first color channel or the second color channel so that, for the color channel for which the gain value is being decreased, in at least one image acquired under the adjusted gain (which image, again, could be but does not have to be one of the modified images from which the CL data is actually determined), there are no pixels containing pixel values above a predefined maximum value. In other words, the gain of one of the channels may be decreased so that when an image is acquired with the image acquisition device configured with the adjusted gain for that channel, there are no pixels containing pixel values above a predefined maximum pixel value, e.g. as can be seen from the histogram of the pixel values for that channel. Such an embodiment ensures that the entire range of the intensity modulations of the CL can be identified.

In an embodiment, the step of adjusting the initial gain of the first color channel and/or the initial gain of the second color channel could comprise increasing a gain value of the initial gain of either the first color channel or the second color channel so that, for the color channel for which the gain value is being increased, the number of pixels that are under-exposed (i.e. pixels containing pixel values that are clipped to the minimum pixel value) in at least one image acquired under the initial gain decreases to be equal to or below a predefined so-called "underexposure threshold" in at least one image acquired under the adjusted gain. Again, the latter image could be but does not have to be one of the modified images from which the data embedded into the light output is actually determined. In other words, the gain of one of the channels may be increased so that the number of under-exposed pixels in an image of a scene acquired with the image acquisition device configured with the initial gain for that channel is decreased to be equal to or below the predefined underexposure threshold in an image of a scene acquired with the image acquisition device configured with the increased gain for that channel. In this manner, at least some of the pixel values that were previously clipped to the minimum pixel value of the pixel value range, e.g. to the value of 0 when the pixel value range is 0-255, are no longer clipped and it is possible to detect CL from at least some of those pixels.

Alternative to the embodiment of increasing the gain as described above, in an embodiment, the step of adjusting the initial gain of the first color channel and/or the initial gain of the second color channel could comprise increasing a gain value of the initial gain of either the first color channel or the second color channel so that, for the color channel for which the gain value is being increased, in at least one image acquired under the adjusted gain (which image, again, could be but does not have to be one of the modified images from which the CL data is actually determined), there are no pixels containing pixel values below a predefined minimum value. In other words, the gain of one of the channels may be increased so that when an image is acquired with the image acquisition device configured with the adjusted gain for that channel, there are no pixels containing pixel values below a predefined minimum pixel value, e.g. as can be seen from the histogram of the pixel values for that channel.

In an embodiment, the step of adjusting the initial gain of the first color channel and/or the initial gain of the second color channel could include adjusting a color-temperature setting of the image acquisition device. Adjusting the color-temperature setting of the image acquisition device, e.g. from the standard "daylight" color-temperature setting to a "tungsten" color-temperature setting causes at least one color channel to cover a different range of intensity values than the other channels. In one further embodiment, the step of adjusting the color-temperature setting could comprise selecting one color-temperature setting from a plurality of predefined color-temperature settings. Such a plurality of predefined color-temperature settings of the image acquisition device could comprise the standard settings of conventional cameras such as e.g. tungsten, daylight, or cloudy and shade color-temperature settings.

In an embodiment, the method may further include applying a first reverse adjustment function to pixel values of the one or more of the acquired images of the plurality of first pixels and a second reverse adjustment function to pixel values of the one or more of the acquired images of the plurality of second pixels to obtain pixels values of the one or more of the acquired images corresponding to the initial gains for the first and second color channels. In this manner, in post-processing, images acquired with the gains optimized for CL detection can be compensated to obtain at least an approximation of images that would have been acquired with an image acquisition device with the initial gains for the different color channels.

In an embodiment, the method may further include applying a reverse adjustment to the adjusted gains of the first color channel and the second color channel so that the gains of the first and second colors channels are the initial gains. This embodiment advantageously allows for reversing of the settings of the image acquisition device from being optimized for CL-detection to the standard settings optimized e.g. for white balance.

In various embodiments, the acquired images may be still images (i.e., the image acquisition device is a part of a still camera) or may be images forming a video stream (i.e., the image acquisition device is a part of a video camera). Of course, the image acquisition device could be a part of a camera capable of functioning in both as a still camera and as a video camera.

According to another aspect of the present invention, a data processing system comprising at least a processor configured for carrying out the methods described herein is disclosed.

According to yet another aspect of the present invention, a CL detection system for determining data embedded into a light output of a light source as modulations of one or more characteristics of the light output, preferably intensity modulations of the light output, is disclosed. The system includes at least an image acquisition device and a processing unit. The image acquisition device, e.g. a camera, is configured for acquiring the one or more images to be processed by the processing unit. The image acquisition device includes at least a first color channel comprising a plurality of first pixels configured to detect light in a first wavelength range during the acquisition of images and a second color channel comprising a plurality of second pixels configured to detect light in a second wavelength range during the acquisition of images, the second wavelength range being different from the first wavelength range. The processing unit is configured for carrying out the methods described herein. In particular, the processing unit is configured for adjusting an initial gain of the first color channel and/or an initial gain of the second color channel so that the distribution of a histogram of pixel values for the first color channel is substantially different from the distribution of a histogram of pixel values for the second color channel according to one or more measures of distribution, obtaining one or more images of a scene acquired with the image acquisition device configured with the adjusted gains for the first and second color channels, the scene containing the light output of the light source, and processing pixel values of at least some of the plurality of first pixels and the plurality of second pixels in the one or more of the acquired images to determine the data embedded into the light output. Such a CL detection system may be implemented, for example, in a remote control for controlling the illumination system or included in another unit such as a camera, a tablet computer, a smartphone, a switch, or a sensor device which then may also be used e.g. for controlling the individual CL sources of the illumination system.

Moreover, a computer program for carrying out the methods described herein, as well as a non-transitory computer readable storage-medium storing the computer program are provided. A computer program may, for example, be downloaded (updated) to the existing control systems (e.g. to the existing optical receivers, remote controls, smartphones, or tablet computers) or be stored upon manufacturing of these systems.

Hereinafter, an embodiment of the invention will be described in further detail. It should be appreciated, however, that this embodiment may not be construed as limiting the scope of protection for the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
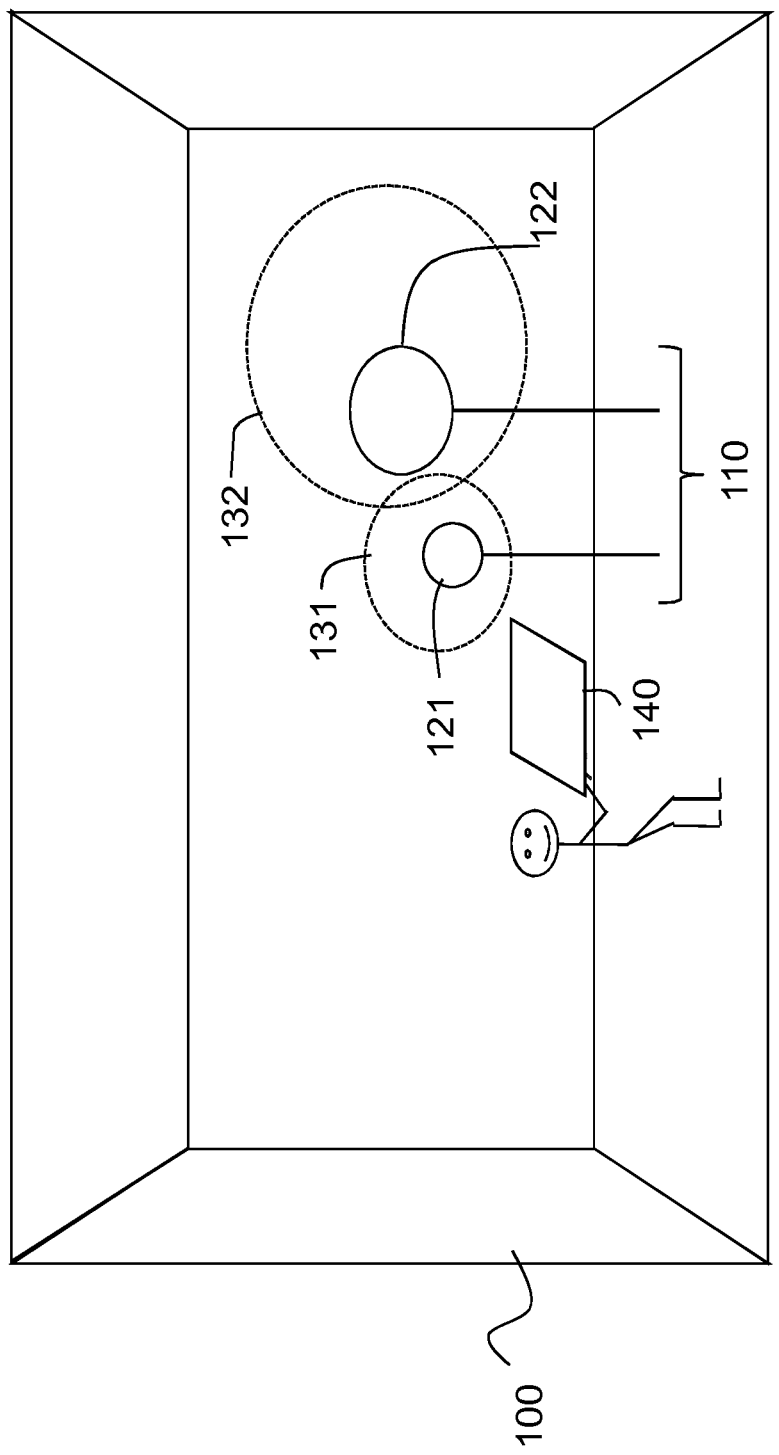
FIG. 1 is a schematic illustration of an illumination system installed in a structure according to one embodiment of the present invention.

FIG. 1 illustrates an exemplary structure 100, here being a room, in which an illumination system 110 is installed. In the illustrative embodiment shown in FIG. 1, the illumination system 110 comprises two light sources 121 and 122. The light sources may comprise any suitable source of light such as e.g. high/low pressure gas discharge sources, laser diodes, inorganic/organic light emitting diodes, incandescent sources, or fluorescent sources. During operation, the light output provided by the light source 121 and/or the light output provided by the light source 122 contribute to the total illumination provided by the illumination system 110 for illuminating at least parts of the structure 100. The illumination contributions from the light sources 121 and 122 on the structure are shown in FIG. 1 as footprints 131 and 132, respectively (the footprints in this exemplary drawing are intended to be on the wall of the perspective drawings of the structure 100 that is the farthest from the reader). The footprints from the light sources may overlap.

The light output of the light sources 121, 122 preferably has contributions both in the wavelength range of the first color channel and in the wavelength range of the second color channel. Furthermore, the light output of at least one of the light sources 121, 122 may be coded such that the light output comprises data embedded therein, e.g. an individual identifier code ID#1, 2, respectively, which is typically an embedded code emitted as a temporal sequence of modulations in the characteristics of the light emitted from the light source. As used herein, the terms "identifier" or "ID code" refer to any codes that allow sufficient identification of individual CL sources within the illumination system. The coded light produced by a CL source may further comprise other information regarding the light source, such as e.g. current light settings and/or other information which may or may not relate to the light source.

Data is embedded into the light outputs of the CL sources by modulating, for each CL source, a drive signal to be applied to the light source in response to a particular code signal. There are various techniques for embedding data into the light output of a light source (e.g. pulse width modulation, amplitude modulation, etc.) as well as various techniques for decoding the embedded data on the receiving end (i.e., from the light detected by an image acquisition device), all of which techniques are known to people skilled in the art and, therefore, are not described here in detail.

Figure 2:
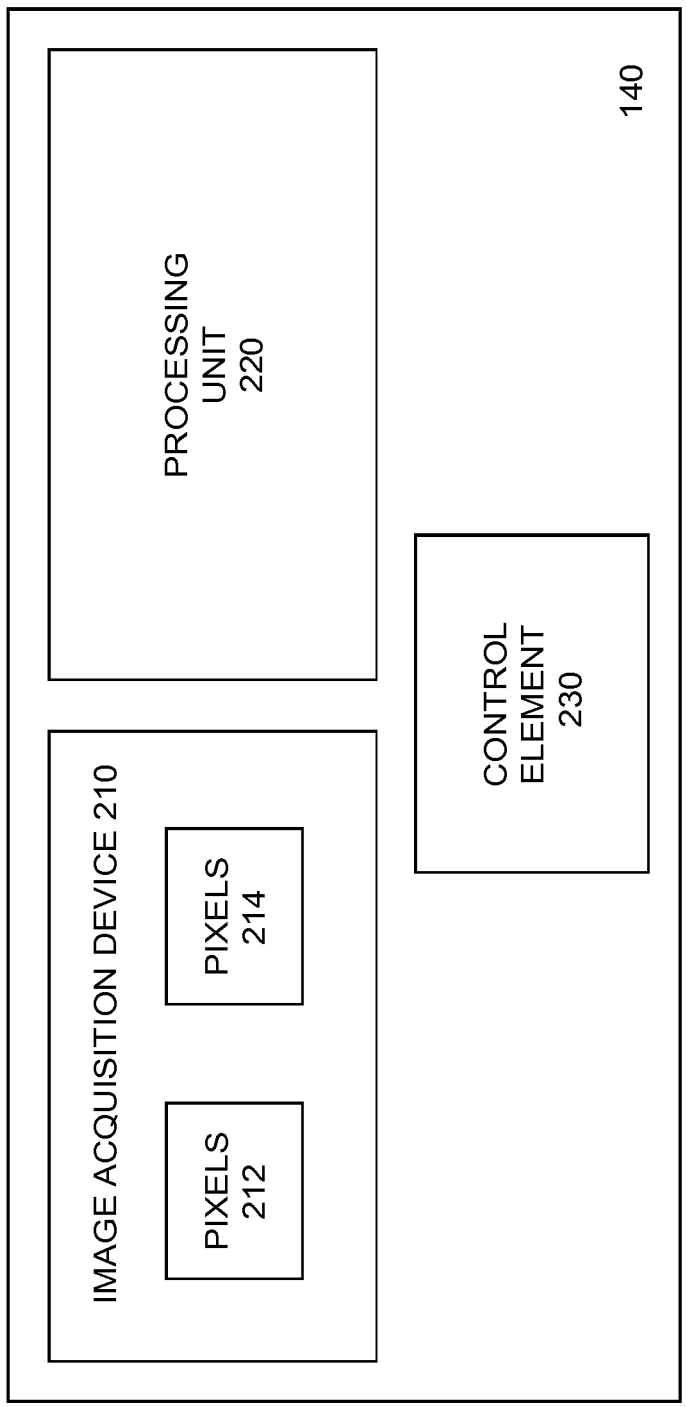
FIG. 2 is a schematic illustration of a CL detection system, according to one embodiment of the present invention.

The illumination system 110 may further comprises a detection system 140 for allowing detection of data embedded into light output of the light sources, i.e. allowing detection of CL. FIG. 2 is a schematic illustration of the CL detection system 140, according to one embodiment of the present invention. As shown in FIG. 2, the CL detection system 140 includes at least an image acquisition device 210, e.g. in a form of a camera, configured for acquiring one or more images of a scene and a processing unit 220 configured for processing the acquired images according to the methods described herein. Optionally, the CL detection system 140 could also include a specifically designated control element 230, e.g. a RF/WiFi communication enabled element, for controlling the light sources that generate CL, e.g. once data embedded into their light output has been detected.

As shown in FIG. 2, the image acquisition device 210 comprises a plurality of first pixels 212 and a plurality of second pixels 214. Each pixel of the pixels 212 and 214 is or comprises a photo sensor used to generate an electrical signal, typically a voltage signal, in response to light impinging onto the photoactive material of the photo sensor. The photo sensor of a pixel is typically a smallest addressable element of an image acquisition device and the pixels of an image acquisition device are typically arranged in one or more matrices.

The magnitude of an electrical signal generated by a pixel is typically proportional to the intensity of the light impinging on the pixel in the wavelength range that the pixel is configured to sense, which, in turn may be representative of the total light output of the illumination system at a particular physical position within the scene. In other words, a pixel value that a pixel generates and contains as a result of light impinging on the pixel is indicative of the intensity of the total light, in the wavelength range that the pixel is configured to detect light in, impinging on a pixel. Preferably, pixels contain digital values, e.g. each pixel value could be an 8-bit value, thus providing a resolution of 256 different pixel values, from 0 to 255.

Each of the plurality of pixels 212 is configured to detect light in a first wavelength range and each of the plurality of pixels 212 is configured to detect light in a second wavelength range. Thus, the pixels 212 form a first color channel of a multi-color-channeled image acquisition device 210, while the pixels 214 form a second color channel. The image acquisition device 210 may include further color channels each comprising a plurality of pixels configured to detect light in a substantially different wavelength range (the wavelength ranges of the different color channels may, however, overlap). For example, conventional cameras typically comprise red, green, and blue pixels (RGB) configured to detect light in red, green, and blue spectral ranges of the electromagnetic energy, respectively. For example, as used in the art, the term "red channel" typically refers to a wavelength range centered around approximately 680 nm (e.g. from 620 nm to 740 nm), the term "green channel" typically refers to a wavelength range centered around approximately 530 nm (e.g. from 490 nm to 570 nm), the term "blue channel" typically refers to a wavelength range centered around approximately 470 nm (e.g. from 450 nm to 490 nm), etc.

As described in greater detail below, the processing unit 220 is configured to control at least some of the functionality of the image acquisition device 210, such as e.g. adjusting the gains of the different color channels of the image acquisition device 210 and instructing the device 210 to acquire images of a scene.

While the CL detection system 140 is illustrated in FIG. 2 as a single unit, persons skilled in the art will realize that functionality of the individual elements illustrated in FIG. 2 to be within the system 140 could also be distributed among several other units. In particular, the image acquisition device 210 and the processing unit 220 do not have to form part of the same device. Oftentimes they do, however, e.g. if the CL detection device 140 is a camera, a smartphone, a tablet, or a portable electronic device.

Figure 3:
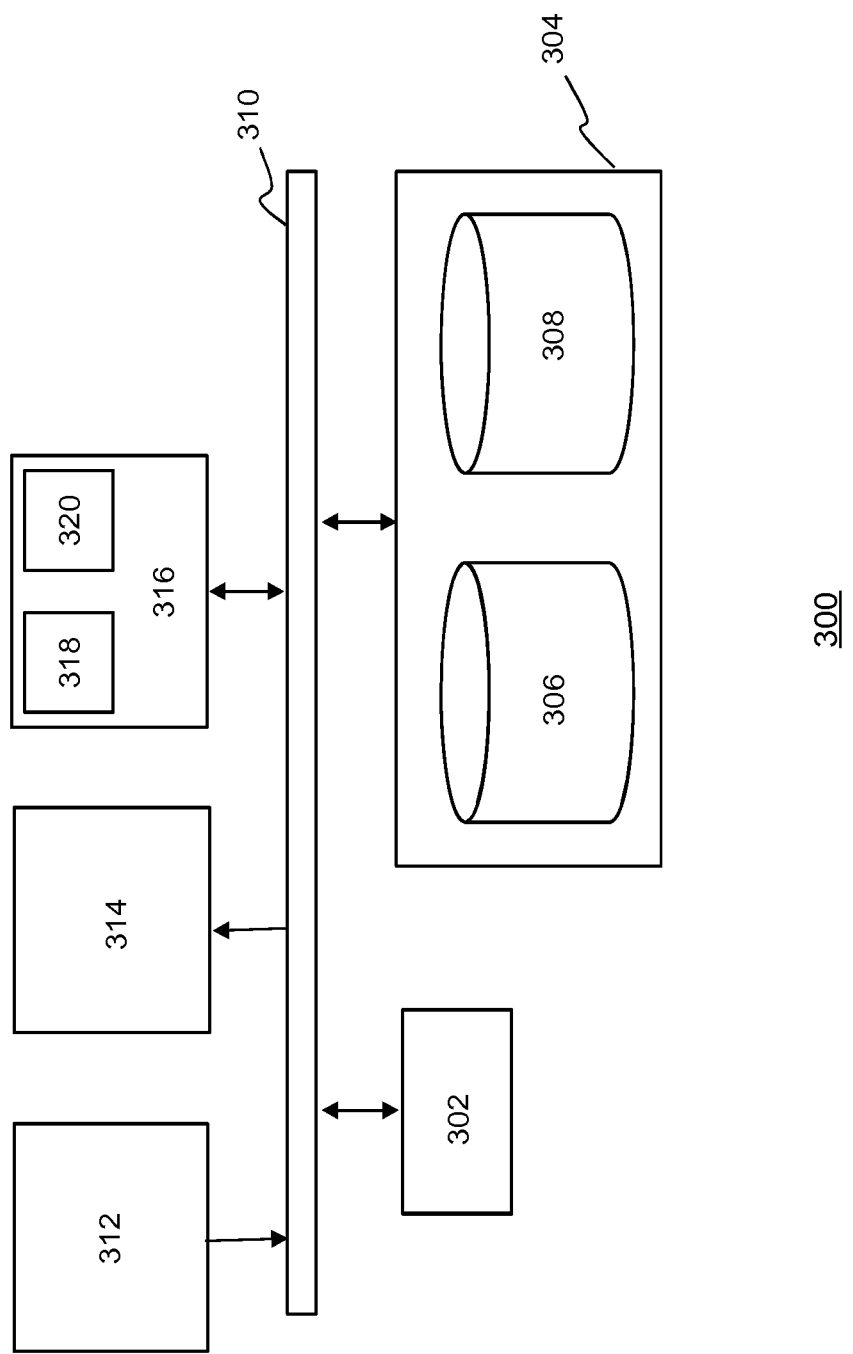
FIG. 3 is a schematic illustration of an exemplary data processing system, according to one embodiment of the present disclosure.

FIG. 3 is a schematic illustration of an exemplary data processing system 300 that may be used e.g. as the processing unit 220 shown in FIG. 2, according to one embodiment of the present disclosure.

Data processing system 300 may include at least one processor 302 coupled to memory elements 304 through a system bus 310. As such, the data processing system 300 may store program code within the memory elements 304. Further, the processor 302 may execute the program code accessed from the memory elements 304 via the system bus 310. In one aspect, the data processing system 300 may be implemented as a computer that is suitable for storing and/or executing program code. It should be appreciated, however, that system 300 may be implemented in the form of any system including a processor and memory that is capable of performing the functions described within this specification.

In various embodiments, the memory elements 304 may include one or more physical memory devices such as, for example, a local memory 306 and one or more bulk storage devices 308. Local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 308 during execution.

Input/output (I/O) devices depicted as an input device 312 and an output device 314 optionally can be coupled to the data processing system 300. Examples of an input device may include, but are not limited to, for example, a keyboard, a pointing device such as a mouse, or the like. Examples of an output device may include, but are not limited to, for example, a monitor or display, speakers, or the like. The input device 312 and/or the output device 314 may be coupled to the data processing system 300 either directly or through intervening I/O controllers (not shown in FIG. 3). A network adapter 316 may also, optionally, be coupled to the data processing system 300 to enable it to become coupled to other systems, computer systems, remote network devices, and/or remote storage devices through intervening private or public networks. In an embodiment, the network adapter 316 may, in particular, comprise a data receiver 318 for receiving data that is transmitted by said systems, devices and/or networks to said data and a data transmitter 320 for transmitting data to said systems, devices and/or networks. Modems, cable modems, and Ethernet cards are examples of different types of network adapter that may be used with the data processing system 300.

The memory elements 304 may store an application (not shown). It should be appreciated that the data processing system 300 may further execute an operating system (not shown in FIG. 3) that can facilitate execution of the application. Application, being implemented in the form of executable program code, can be executed by the data processing system 300, e.g., by the processor 302. Responsive to executing application, the data processing system may be configured to perform one or more operations to be described herein in further detail.

Figure 4A:
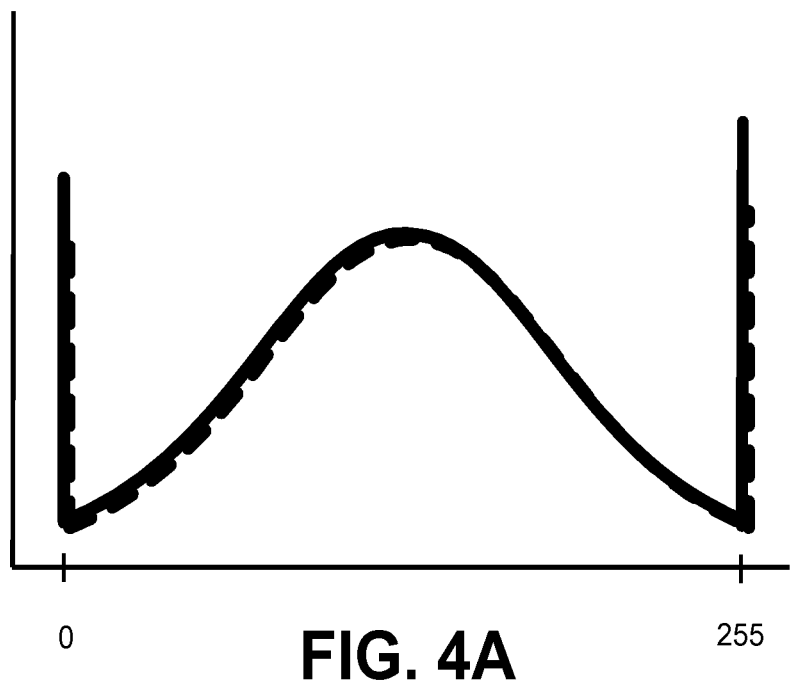
FIGS. 4A and 4B provide schematic illustrations of histograms associated with two different color channels according to, respectively, an initial and an adjusted gain setting, according to one embodiment of the present invention.
Figure 4B:
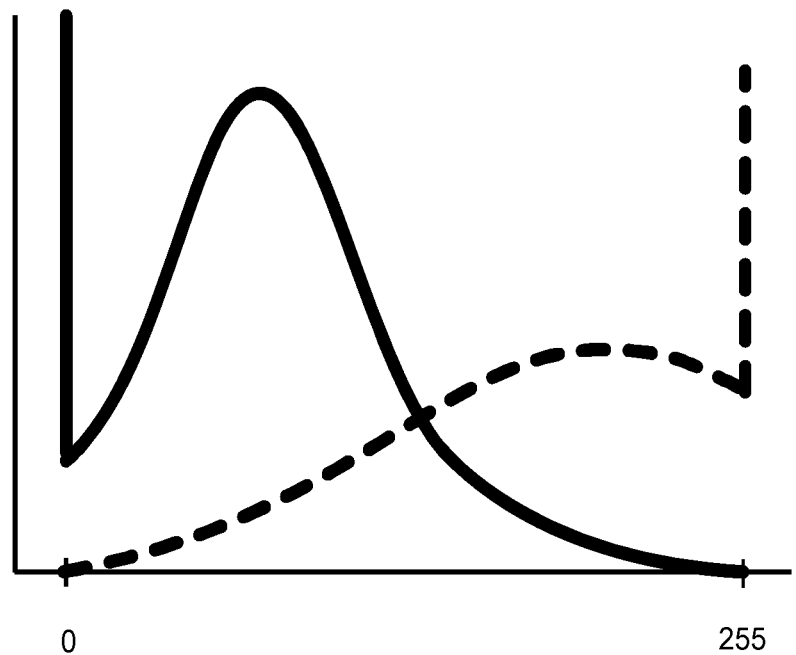

FIGS. 4A and 4B provide schematic illustrations of histograms associated with two different color channels according to, respectively, an initial and an adjusted gain setting, according to one embodiment of the present invention. In FIGS. 4A and 4B, the horizontal axis depicts the range of possible pixel values. In this exemplary illustration, this range is bounded by the values 0 and 255 (i.e., pixel values are 8-bit values). As skilled persons will realize, a pixel comprising a pixel value above a predetermined upper threshold (in this case, 255) indicates overexposure, or saturation, of the pixel (i.e., saturation of the sensor providing the pixel data), while a pixel comprising a pixel value below a predetermined lower threshold (in this case, 0) indicates underexposure of the pixel (i.e., underexposure of the sensor providing the pixel data).

The vertical axis of FIGS. 4A and 4B depicts the frequency of occurrence of each pixel value. In FIGS. 4A and 4B, histograms of one color channel, e.g. the first color channel, are represented by a solid line, while histograms of the other color channel, e.g. the second color channel, are represented by a dashed line.

FIG. 4A schematically depicts an example of the histograms for the first and second color channels as a result of the initial gain setting. Such an initial gain setting can for example result from the automatic white-balance control of the camera which commonly adjusts the gain of each channel based on an assumption that the world is grey. As a result, as can be seen in FIG. 4A, the histograms of each of the color channels tend to largely coincide. Also as a result, some of the detected pixel values are clipped to the minimum pixel value (in this case, 0) and the maximum pixel value (in this case, 255). This occurs for both channels simultaneously, as shown with a spike (i.e. a vertical line) in the histograms for both channels at the pixel value of 0 and at the pixel value of 255. Thus, FIG. 4A illustrates that, under typical gain settings, all color channels tend to adopt about the same pixel values when the camera is aimed at the light and tend to clip in the same over- or under-exposed regions. CL modulations would then be lost simultaneously for all color channels.

FIG. 4B schematically depicts an example of the histograms for the first and second color channels as a result of the adjusted gain setting. As can be seen from FIG. 4B, the gain of the first color channel has been reduced from the initial value of FIG. 4A, such that the bright areas of the acquired images that initially contained clipped pixel values (i.e., the vertical spike for the first color channel at the pixel value of 255 in the histogram of FIG. 4A) are now quantized within the available pixel value range. As a result, in FIG. 4B there is no vertical spike for the first color channel at the pixel value of 255, indicating that there are no over-exposed pixels within the pixels 212. However this happens at the cost of an increase of the values that are clipped at the lower pixel value boundary (i.e., more clipping at the pixel value 0).

As can also be seen from FIG. 4B, the gain of the second color channel has been increased from the initial value of FIG. 4A, such that the dark areas of the acquired images that initially contained clipped pixel values (i.e., the vertical spike for the second color channel at the pixel value of 0 in the histogram of FIG. 4A) are now dispersed over multiple pixel values, yet at the cost of extra clipping in the bright areas (i.e., more clipping at the pixel value 255).

Figure 5:
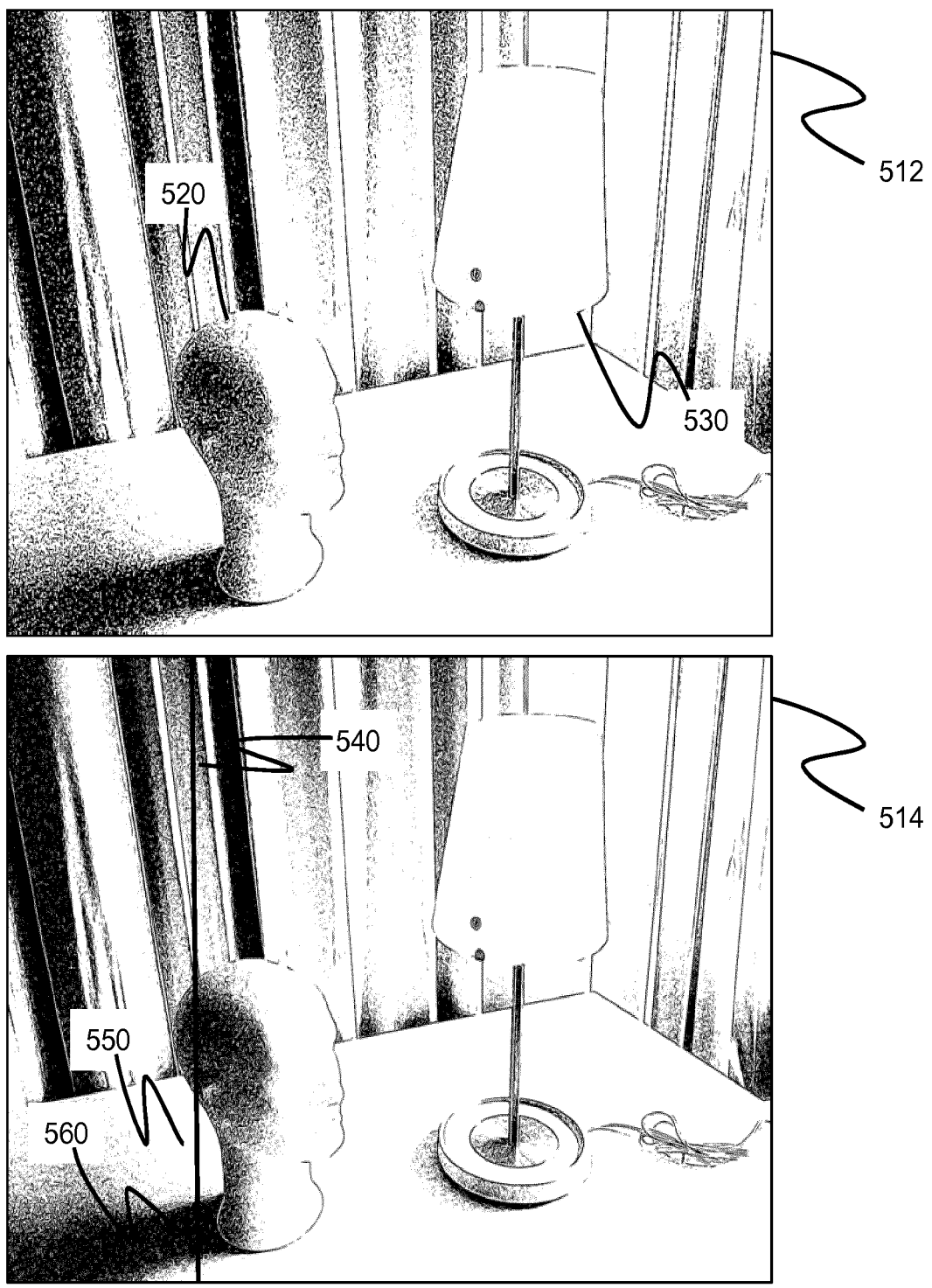
FIG. 5 is a schematic illustration of a first image and a second image as acquired via the first and second color channels, respectively, under the initial gain setting of FIG. 4A, according to one embodiment of the present invention.

FIG. 5 is a schematic illustration of a first image 512 and a second image 514 as acquired via the first and second color channels, respectively, under the initial gain setting of FIG. 4A, according to one embodiment of the present invention. Thus, the first image 512 represents pixel values generated by the pixels 212, while the second image 514 represents pixel values generated by the pixels 214, taking into consideration the clipping to the minimum and the maximum pixel values in accordance with the available pixel value range of the image acquisition device 210.

As can be seen in FIG. 5, under automatic white-balance adjustment the images 512 and 514 tend to become similar, especially in absence of strongly saturated colors in the scene. Both images depict white or grey objects such as the head sculpture 520 and the lamp 530 in almost identical fashion. A line 540 in FIG. 5 depicts the location of an example column that contains both a bright area 550 and a dark area 560. The bright area 550 is likely to result in the corresponding pixels being over-exposed and their pixel values being clipped to the maximum pixel value of the pixel value range of the image acquisition device, while the dark area 560 is likely to result in the corresponding pixels being under-exposed and their pixel values being clipped to the minimum pixel value of the pixel value range of the image acquisition device.

Figure 6:
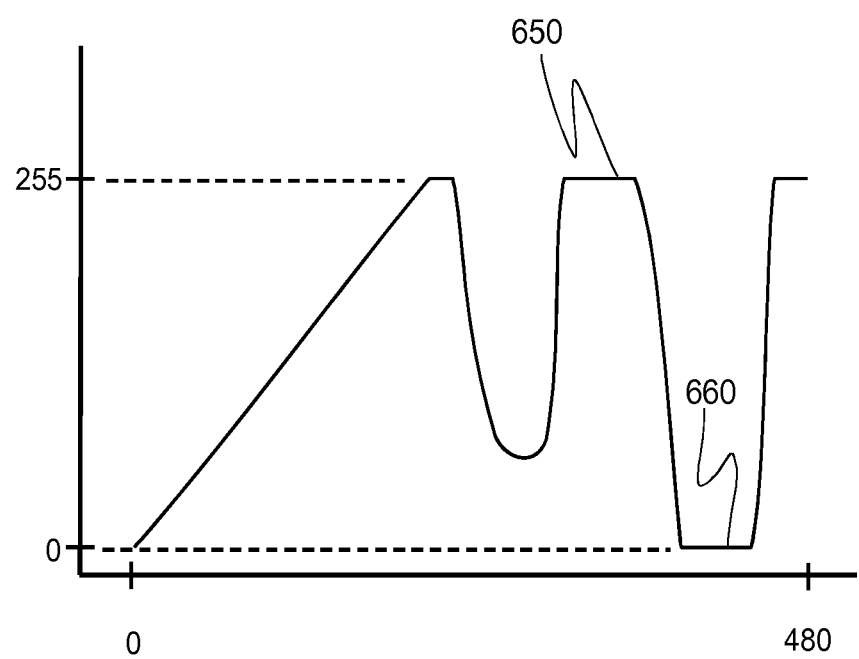
FIG. 6 is a schematic illustration of the pixel values along the exemplary line illustrated in FIG. 5, according to one embodiment of the present invention.

FIG. 6 is a schematic illustration of the pixel values along the exemplary line 540 of FIG. 5, according to one embodiment of the present invention. In FIG. 6, the horizontal axis depicts an example range of vertical positions, where the value of 0 is associated with the top row in the images of FIG. 5, while the value of 480 is associated with the bottom row. The vertical axis depicts the range of possible pixel values (i.e., the 0-255 range).

The pixel values associated with the bright area 550 in FIG. 5 contain clipped pixel values 650 in FIG. 6. The pixel values associated with the dark area 560 in FIG. 3 contain clipped pixel values 660 in FIG. 6. Obviously, no CL detection can be performed from the clipped pixel values 650 and 660.

FIG. 6 provides an illustration for the exemplary line in the outcome (i.e., the image) of second color channel only. Since under the initial gain setting as depicted in FIG. 4A both channels adopt approximately the same pixel values, an illustration such as that of FIG. 6 for an exemplary line in the output of a first color channel is not provided as it would look substantially the same as that of FIG. 6.

Figure 7:
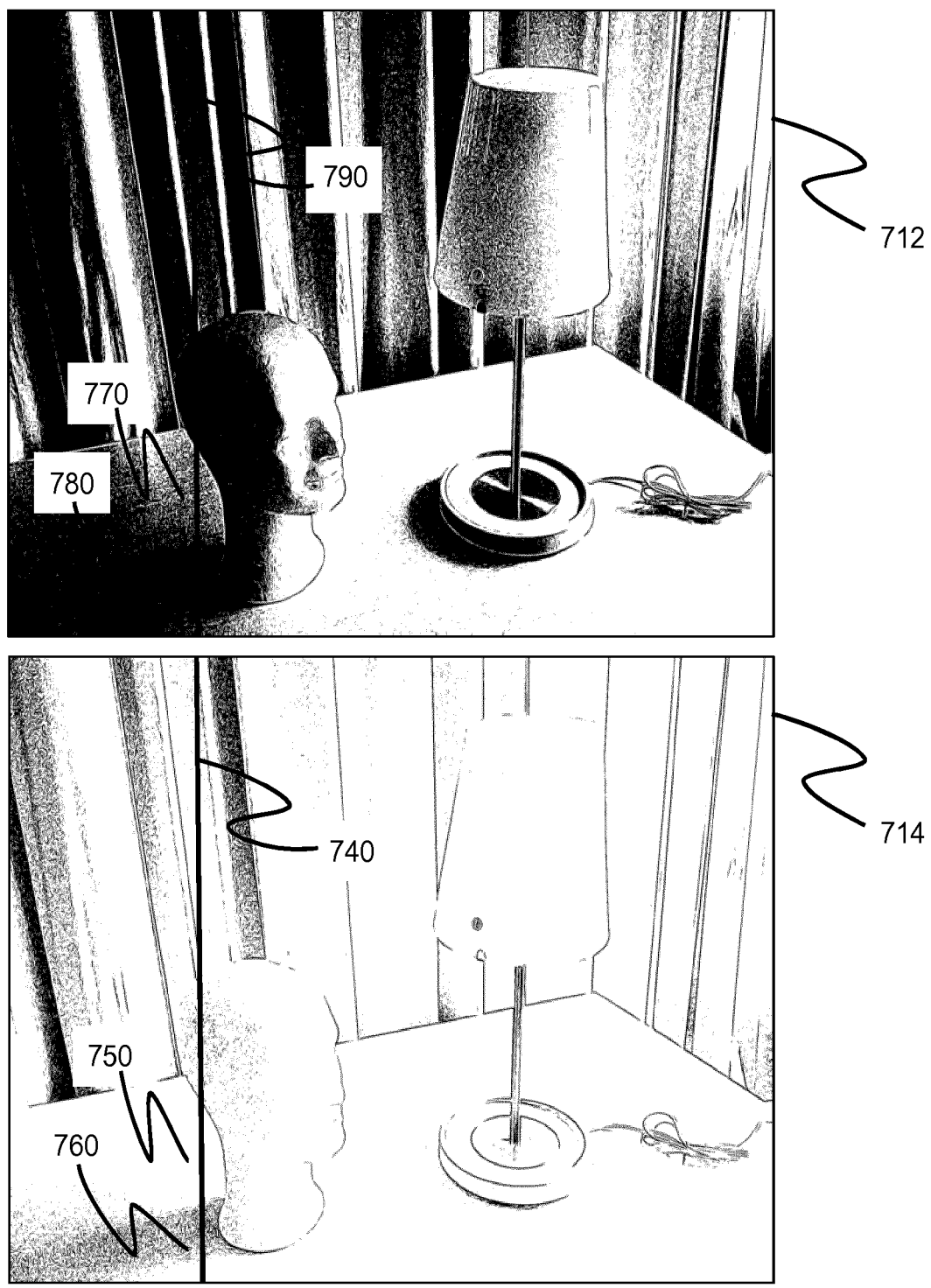
FIG. 7 is a schematic illustration of a first image and a second image as acquired via the first and second color channels, respectively under the adjusted gain setting of FIG. 4B, according to one embodiment of the present invention.

FIG. 7 is a schematic illustration of a first image 712 and a second image 714 as acquired via the first and second color channels, respectively, under the adjusted gain setting of FIG. 4B, according to one embodiment of the present invention. Thus, the first image 712 represents pixel values generated by the pixels 212, while the second image 714 represents pixel values generated by the pixels 214, taking into consideration the clipping to the minimum and the maximum pixel values in accordance with the available pixel value range of the image acquisition device 210.

As can be seen from the image 714, increasing the gain of the second color channel reduces clipping in dark areas such as the dark area 760 (corresponding to the area 560 in FIG. 5), but increases clipping in bright areas such as the bright area 750 (corresponding to the area 550 in FIG. 5). A line 740 in FIG. 7 depicts the location of an example column in the image 714 acquired via the second color channel, corresponding to the line 540 of FIG. 5.

As can be seen from the image 712, decreasing the gain of the first color channel reduces clipping in bright areas such as a bright area 770 (corresponding to the area 550 in FIG. 5, if that area would have been identified in FIG. 5 in the image for the first color channel), but increases clipping in dark areas such as a dark area 780 (corresponding to the area 560 in FIG. 5, if that area would have been identified in the image for the first color channel). A line 790 in FIG. 7 depicts the location of an example column in the image 712 acquired via the first color channel, analogous to the line 540 of FIG. 5 but drawn for the output of the first color channel.

Figure 8:
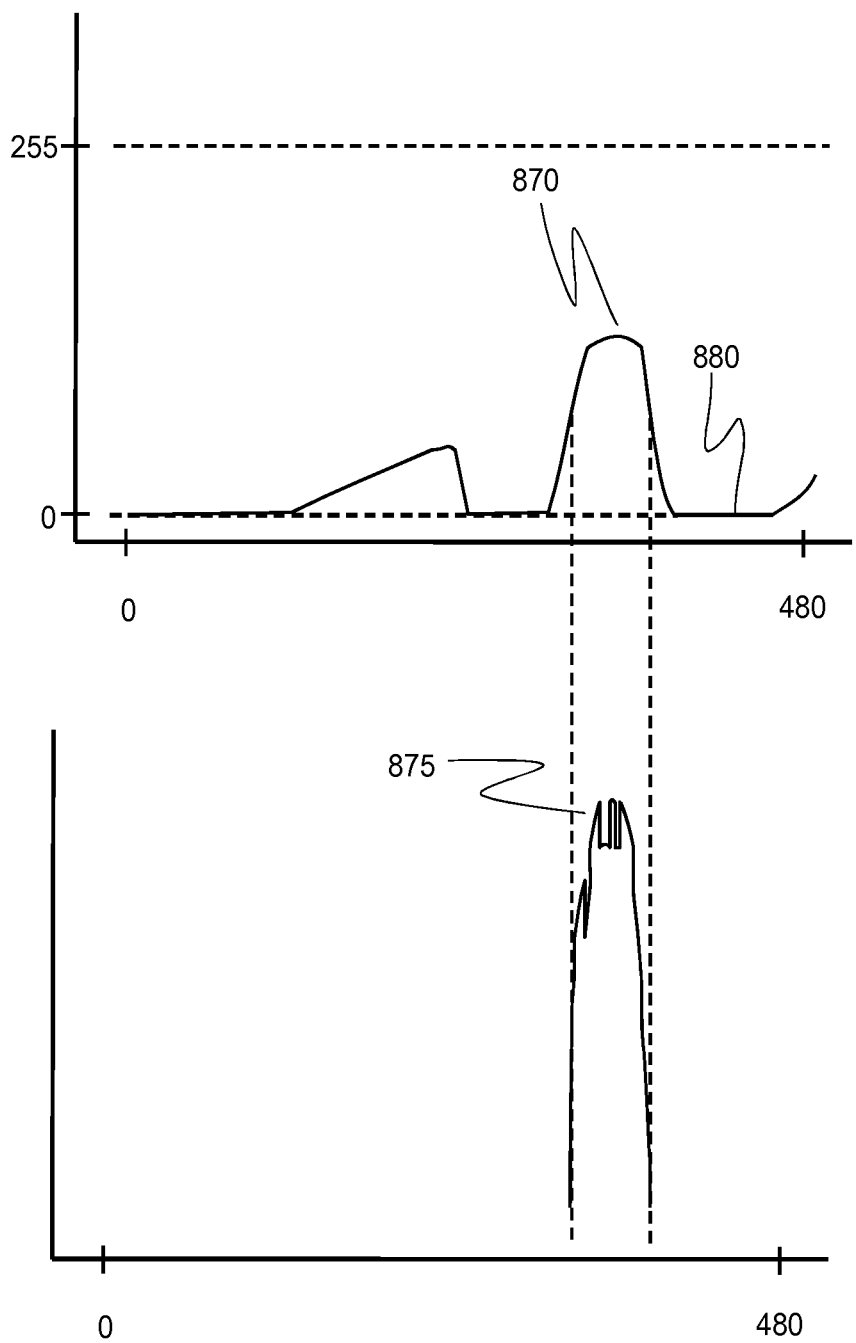
FIG. 8 is a schematic illustration of the pixel values along the exemplary line in the image for the first color channel shown in FIG. 7, according to one embodiment of the present invention.

FIG. 8 is a schematic illustration of the pixel values along the exemplary line 790 in the image 712 for the first color channel as shown in FIG. 7, according to one embodiment of the present invention. FIG. 8 provides two views—the top view illustrates a curve of the pixel values along the line 790 for the entire pixel value range on the vertical axis (i.e., the range 0-255), while the bottom view illustrates the same curve as in the top view but magnified in the vertical direction (i.e., the vertical axis does not illustrate the entire range of the pixel values, but rather the sub-range of the highest pixel values of the curve in the top view). The two vertical dotted lines in FIG. 8 indicate the corresponding curve sections in the top and bottom views of FIG. 8.

The pixels in the bright area 770 in FIG. 7 are represented by pixel values 870 in the top view of FIG. 8. The pixels in the dark area 780 in FIG. 7 are represented by pixel values 880 in the top view of FIG. 8. As can be seen from the top view of FIG. 8, when the gain of the first color channel is decreased, at least some of the pixels that were clipped before as being over-exposed (see pixel values 650 in FIG. 6) are no longer clipped (see pixel values 870 in FIG. 8). However, in the darker areas of the image, the number of clipped pixels increases, as can be seen from the fact that in FIG. 8 there are more pixel values 880 clipped to the minimum pixel value of 0 as compared with the pixel values 660 in FIG. 6.

A magnified version of the pixel values 870 is shown in the bottom view of FIG. 8 as pixel values 875. The pixel values 875 illustrate that, assuming that the light contains embedded information in the form of a temporal modulation, in absence of clipping due to overexposure, the modulation indicated by the pixel values 875 is now captured within the range of possible pixel values.

Figure 9:
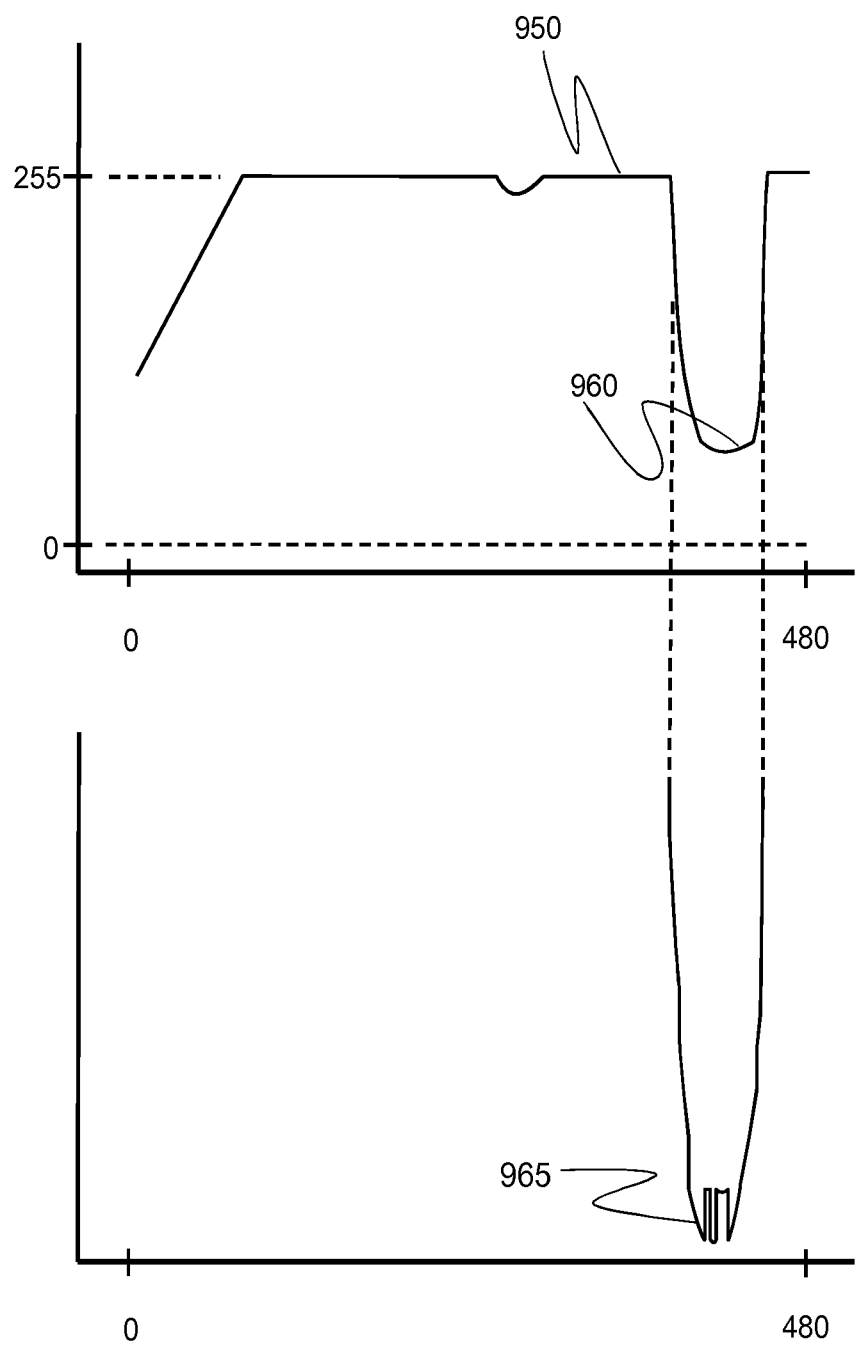
FIG. 9 is a schematic illustration of the pixel values along the exemplary line in the image for the second color channel as shown in FIG. 7, according to one embodiment of the present invention.

FIG. 9 is a schematic illustration of the pixel values along the exemplary line 740 in the image 714 for the second color channel as shown in FIG. 7, according to one embodiment of the present invention. Similar to FIG. 8, FIG. 9 provides two views—the top view illustrates a curve of the pixel values along the line 740 for the entire pixel value range on the vertical axis (i.e., the range 0-255), while the bottom view illustrates the same curve as in the top view but magnified in the vertical direction (i.e., the vertical axis does not illustrate the entire range of the pixel values, but rather the sub-range of the lowest pixel values of the curve in the top view). The two vertical dotted lines in FIG. 9 indicate the corresponding curve sections in the top and bottom views of FIG. 9.

The pixels in the bright area 750 in FIG. 7 are represented by pixel values 950 in the top view of FIG. 9. The pixels in the dark area 760 in FIG. 7 are represented by pixel values 960 in the top view of FIG. 9. As can be seen from the top view of FIG. 9, when the gain of the second color channel is increased, at least some of the pixels that were clipped before as being under-exposed (see pixel values 660 in FIG. 6) are no longer clipped (see pixel values 960 in FIG. 9). However, in the brighter areas of the image, the number of clipped pixels increases, as can be seen from the fact that in FIG. 9 there are more pixel values 950 clipped to the maximum pixel value of 255 as compared with the pixel values 650 in FIG. 6.

A magnified version of the pixel values 960 is shown in the bottom view of FIG. 9 as pixel values 965. The pixel values 965 illustrate that, assuming that the light contains embedded information in the form of a temporal modulation, in absence of clipping due to underexposure, the modulation indicated by the pixel values 965 is now captured within the range of possible pixel values.

Detection of CL could then be carried out based on the pixel values of the modified images from either one of the first and second color channels as illustrated in the above-described figures, or partially based on the pixel values of the modified images from the pixels of the first color channel and partially based on the pixel values of the modified images from the pixels of the second color channel, depending on which pixel values are not clipped. For example, if CL modulations are expected to be present in the areas of the acquires images 712 and 714 which are bright (e.g. areas 770 and 750) along the vertical lines 790 and 740, then detection of CL should be carried out based on the pixel values 870/875 of the first color channel (i.e., the channel for which the gain has been decreased compared to the initial gain value) because those pixels are not clipped while the pixel values 950 for the corresponding pixels of the second color channel with the adjusted gain as well as the pixel values 650 for both the first and the second color channels under the initial gain settings are clipped as being over-exposed. If, on the other hand, CL modulations are expected to be present in the areas of the acquires images 712 and 714 which are dark (e.g. areas 780 and 760) along the vertical lines 790 and 740, then detection of CL should be carried out based on the pixel values 960/965 of the second color channel (i.e., the channel for which the gain has been increased compared to the initial gain value) because those pixels are not clipped while the pixel values 950 for the corresponding pixels of the first color channel with the adjusted gain as well as the pixel values 660 for both the first and the second color channels under the initial gain settings are clipped as being under-exposed. Thus, differentiating between over- and under-exposure areas or pixel values, where detection of CL is not possible, and areas or pixel values where detection of CL is possible allows detecting CL even though the image acquisition device may be acquiring the one or more images such that at least some of the pixels in some of the color channels may be over- or under-exposed. A skilled person would recognize various manners for selecting and using the non-clipped pixel values from one or more color channels for the detection of data embedded into the light output of various light sources, depending on a particular deployment scenario.

Figure 10:
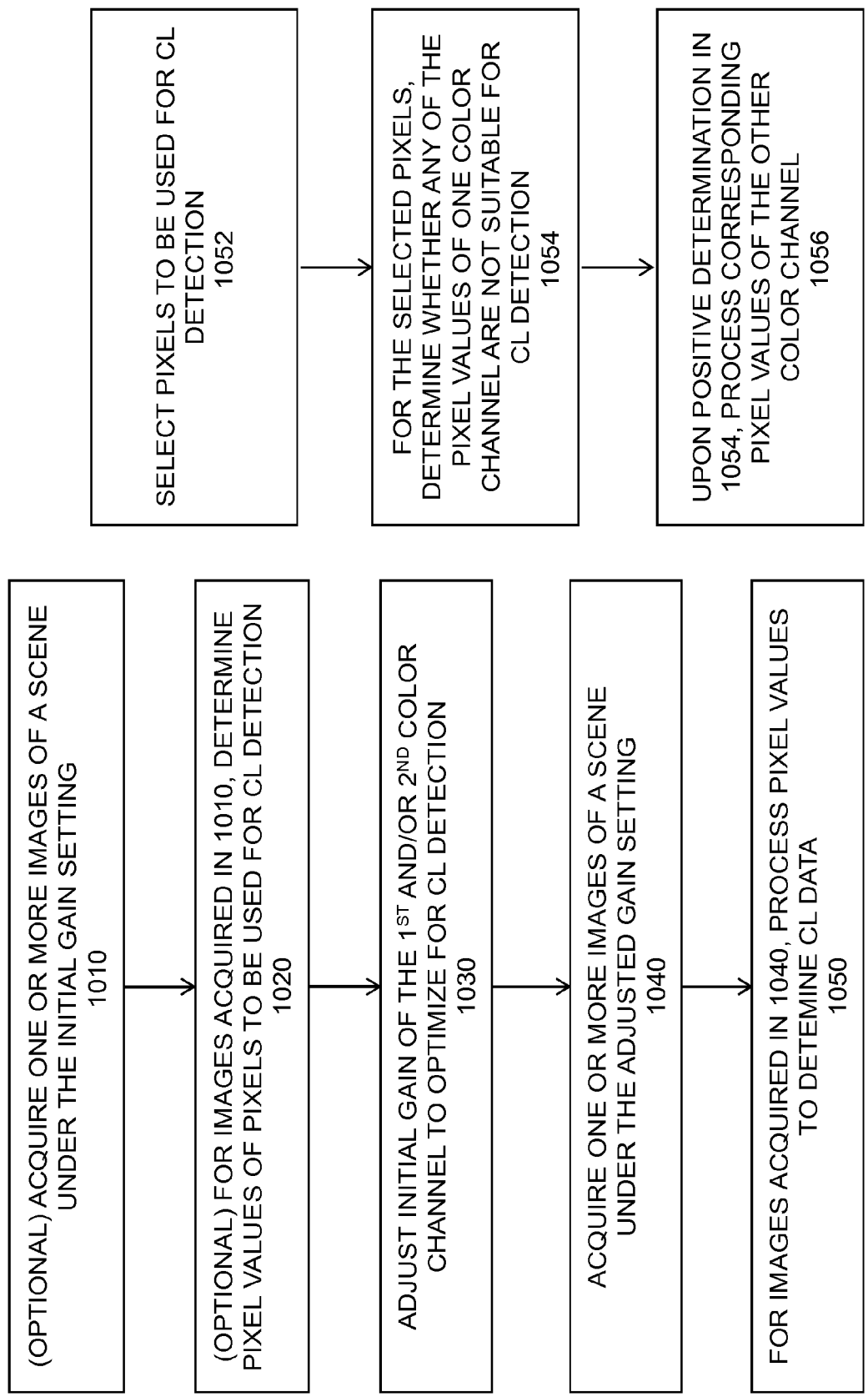
FIGS. 10A and 10B are flow diagrams of method steps for determining data embedded into a light output of a light source, according to various embodiments of the present invention.

FIGS. 10A and 10B are flow diagrams of method steps for determining data embedded into a light output of a light source, according to various embodiments of the present invention. The method steps of FIGS. 10A and 10B are applicable for any CL sources providing light contribution to a scene, such as e.g. the light sources 121 or 122 shown in FIG. 1. While the method steps are described in conjunction with the elements shown in FIGS. 1 and 2, persons skilled in the art will recognize that any system configured to perform the method steps, in any order, is within the scope of the present invention.

In an embodiment, the method of FIG. 10A may begin with two steps which are optional (i.e., not required for all embodiments)—steps 1010 and 1020.

In step 1010, the image acquisition device 210 acquires, e.g. upon receiving an instruction to that effect from the processing unit 220, one or more images of a scene with the image acquisition device 210 being configured with the initial gain setting. The scene is selected to be such that at least a part of the scene includes at least a part of the light output of a CL source for which determination of the embedded CL data is to be carried out. This means, that, if e.g. of the light sources 121 and 122 only light source 121 was a CL source and the data embedded into the light output of the light source 121 is to be determined, then the scene should be selected such as to include at least a part of the footprint 131 of the light source 121. As a skilled person would recognize, for some CL detection methods, the scene should also include the light source 121 itself. If both light sources 121 and 122 are CL sources, then the scene is selected such as to include at least parts of both of the footprints 131 and 132 (as well as, possibly, the light sources 121, 122 themselves).

One purpose of acquiring the one or more images of the scene under the initial gain setting is to later determine how the gain setting should be adjusted to be optimized for CL detection. Another purpose of step 1010 could be to make sure that, in addition to the modified images, the original images as acquired under the initial gain settings are available to the processing unit, e.g. for the purpose of displaying to a user the original images (which are optimized for aesthetic reasons) while it is the modified images (acquired in step 1040) that are used for CL detection. Acquiring the images in step 1010 would then be advantageous because it would eliminate the need for performing post-processing of the modified images to re-create the original images for displaying them to a user.

In step 1020, once the processing unit 220 obtained the one or more images acquired in step 1010, the processing unit 220 determines, from the images acquired under the initial gain setting in step 101, pixel values of pixels, from the pixels 212 and the pixels 214 forming first and second color channels respectively, to be used for detecting CL.

Identifying or selecting particular pixels of the image acquisition device 210 which are to be used for CL detection corresponds to identifying a subarea within the acquired images suitable for detecting the data embedded into the light output of the light source, which subarea within the acquired images corresponds to a subarea within the scene of which the images are acquired. For example, it may be known where in the image the light footprint or a halo of a particular light source will be located. Since some CL detection methods are specifically tailored to determining CL data from the light footprint or the halo of the light source, in order to implement those detection methods pixels corresponding to these areas of the one or more acquired images are selected to be used for CL detection.

In a further optional embodiment, the method of FIG. 10A may further include the step of processing, or attempting to process, the pixel values within the original images to determine the data embedded into the light output (this step is not shown in FIG. 10A). If the processing unit 220 would then determine that CL detection on the basis of the original images acquired in step 1010 is sub-optimal or altogether impossible, e.g. because some of the pixels necessary for the detection are over- or under-exposed, that information could be used in step 1030 to adjust the initial gains of the first and/or second color channels accordingly (i.e. to minimize the over-/under-exposure across the entire range of pixel values).

In step 1030, the processing unit 220 adjusts the initial gain of the first color channel and/or the initial gain of the second color channel to be optimized for CL detection, which means the gains are adjusted so that the distribution of a histogram of pixel values for the first color channel is substantially different from the distribution of a histogram of pixel values for the second color channel according to one or more measures of distribution. Thus, if the initial gains of the first and second color channels were such as to result in the histograms e.g. as shown in FIG. 4A, after the adjustment, the histograms would be e.g. as shown in FIG. 4B, described above.

In an embodiment, the measure of the distribution could be the dispersion. As is well-known, in statistics, dispersion, (also called variability, scatter, or spread) denotes how stretched or squeezed a distribution, either theoretical or that underlying a statistical sample, is. Some common examples of measures of statistical dispersion are the variance, standard deviation, and interquartile range.

As used herein, the expression "substantially different" in the above paragraph is used to describe that the overlap between the histograms of the first and second color channels is reduced to be below 50% of the integrated surfaces under the histograms, preferably below 30%, more preferably below 10%.

In an embodiment, the step 1030 could be the first step of the method of FIG. 10A (i.e., steps 1010 and 1020 were not performed). In such a case, the processing unit 220 would adjust the gain of the first and/or second color channels based e.g. on the assumption that CL detection will take place in an environment (e.g. and office building) with a known color temperature. This color temperature, or the optimal gain values for CL detection, could be provided via a secondary communication channel (e.g. using the wireless connection in that office building) or via a database with known light source characteristics for different locations.

However, in a preferred embodiment, the processing unit 220 would adjust the gains in step 1030 based on the results of processing the images acquired under the initial gain setting (i.e., based on the results of step 1020).

For example, in an embodiment, the processing unit 220 could analyze the pixel values along a line as shown in FIG. 6, described above, for both channels, and conclude that since the pixel values 650 are the ones to be used for CL detection, but they seem to be clipped for all color channels due to being over-exposed under the initial gain setting, the gain of at least one channel (e.g. of the first channel) should be decreased so that CL detection could be carried out based on the pixel values 875 shown in FIG. 8.

In one embodiment, the gain of the first color channel could be decreased until the number of pixels that are over-exposed in the image 512 for the first color channel acquired under the initial gain decreases to be equal to or below a predefined overexposure threshold in at least one image acquired under the adjusted gain. In this manner, at least some, but preferably all, of the pixel values that were previously clipped to the maximum pixel value of the available pixel value range would no longer be clipped and it would be possible to detect CL from at least some of those pixels. How the overexposure threshold could be set or defined is described in greater detail below.

In an alternative embodiment, the gain of the first color channel could be decreased so that, in at least one image acquired under the adjusted gain for the first color channel, there are no pixels containing pixel values above a predefined maximum value. For example, if the available pixel value range of the image acquisition device 210 is defined as 0-255, the predefined maximum pixel value could be set as e.g. 250, indicating that the gain of a channel should be adjusted until there are no pixels containing values higher than 250 under the adjusted gain.

In an alternative or an additional example to that of decreasing the gain of one of the color channels as described above, the processing unit 220 could again analyze the pixel values along a line as shown in FIG. 6, described above, and conclude that since the pixel values 660 are the ones to be used for CL detection, but they seem to be clipped for all color channels due to being under-exposed under the initial gain setting, the gain of at least one channel (e.g. of the second channel) should be increased so that CL detection could be carried out based on the pixel values 965 shown in FIG. 9.

In one embodiment, the gain of the second color channel could be increased until the number of pixels that are under-exposed in the image 514 for the second color channel acquired under the initial gain decreases to be equal to or below a predefined underexposure threshold in at least one image acquired under the adjusted gain. In this manner, at least some, but preferably all, of the pixel values that were previously clipped to the minimum pixel value of the available pixel value range would no longer be clipped and it would be possible to detect CL from at least some of those pixels.

In an alternative embodiment, the gain of the second color channel could be increased so that, in at least one image acquired under the adjusted gain for the second color channel, there are no pixels containing pixel values below a predefined minimum value. For example, if the pixel value range of the image acquisition device is defined as 0-255, the predefined minimum pixel value could be set as e.g. 5, indicating that the gain of a channel should be adjusted until there are no pixels containing values lower than 5 under the adjusted gain.

The foregoing description illustrates that if CL detection could be carried out based either only on the pixel values such as shown with then pixel values 650 or only on the pixel values such as shown with the pixel values 660, then adjusting the gain of one of the two color channels as described above would be sufficient (i.e., either decrease the gain of one channel if it is the pixel values 650 that are to be used for CL detection, or increase the gain of one channel if it is the pixel values 660 that are to be used). If it is both the pixel values 650 and 66 that are to be used for CL detection, then in step 1030 the processing unit 220 may adjust the initial gains of the both settings, as described above in association with FIGS. 8 and 9 and earlier figures that these figures refer to.

Some exemplary manners for setting the overexposure threshold are now described, according to various embodiments of the present invention.

In one exemplary embodiment, an overexposure threshold could be set as a percentage value of the number of pixels of this color channel that were over-exposed under the initial gain. In such an embodiment, an overexposure threshold of N % (N is a number between 0 and 100) means that the number of pixels that are over-exposed under the adjusted gain must be less than N % of the number of pixels that are over-exposed under the initial gain. The overexposure threshold could then be set e.g. as 20%, preferably 10%, more preferably 0% (the latter meaning that no pixels are over-exposed under the adjusted gain).

In another exemplary embodiment, an overexposure threshold could be set as an absolute value. In such an embodiment, an overexposure threshold of e.g. M (M is an integer less than the total number, K, of pixels of the color channel whose gain is being decreased) means that the number of pixels that are over-exposed under the adjusted gain must be less than M pixels. The overexposure threshold could then be set e.g. as 0.2*K (i.e., M=0.2*K), preferably 0.1*K (i.e., M=0.1*K), more preferably 0 (the latter meaning that no pixels are over-exposed under the adjusted gain).

Similar to the discussion above for the overexposure threshold, in various embodiments, the underexposure threshold could be set in various manners.

In one exemplary embodiment, an underexposure threshold could be set as a percentage value of the number of pixels of this color channel that were under-exposed under the initial gain. In such an embodiment, an underexposure threshold of P % (P is a number between 0 and 100, P being equal to or different from number N discussed above) means that the number of pixels that are under-exposed under the adjusted gain must be less than P % of the number of pixels that are under-exposed under the initial gain. The underexposure threshold could then be set e.g. as 20%, preferably 10%, more preferably 0% (the latter meaning that no pixels are under-exposed in an image acquired under the adjusted gain).

In another exemplary embodiment, an underexposure threshold could be set as an absolute value. In such an embodiment, an underexposure threshold of e.g. Q (Q is an integer less than the total number, R, of pixels of the color channel whose gain is being increased) means that the number of pixels that are under-exposed under the adjusted gain must be less than Q pixels. The underexposure threshold could then be set e.g. as 0.2*R (i.e. Q=0.2*R), preferably 0.1*R (i.e., Q=0.1*R), more preferably 0 (the latter meaning that no pixels are under-exposed under the adjusted gain).

In various embodiments, the over- and/or underexposure thresholds could be either determined and set by the processing unit 220 as e.g. described above, or could be predefined in stored in memory to which the processing unit 220 has access.

In an embodiment, adjusting the initial gain of the first and/or second color channel in step 1030 could include adjusting a color-temperature setting of the image acquisition device 210. For example, the adjustment from the standard "daylight" color-temperature setting to a "tungsten" color-temperature setting would cause at least one color channel to cover a different range of intensity values than the other channel(s). Possibly, the step of adjusting the color-temperature setting could include selecting one color-temperature setting from a plurality of predefined color-temperature settings such as e.g. tungsten, daylight, or cloudy and shade color-temperature settings.

The method may then proceed to step 1040 where the image acquisition device 210 acquires, e.g. upon receiving an instruction to that effect from the processing unit 220, one or more images of a scene under the adjusted gain setting, i.e. with the gain values for the first and the second color channels as adjusted in step 1030. Discussion regarding the selection of the scene provided above for the step 1010 is applicable here and is, therefore, not repeated. In fact, the scene of which the images are acquired in step 1040 is preferably, but not necessarily, the same scene as that of which the images were acquired in step 1010.

In an embodiment, the images acquired in step 1040 (as well as the images acquired in step 1010) may be acquired by the image acquisition device 210 which is a rolling-shutter camera, where different pixels (or different groups of pixels) are exposed at different points in time, so that the modulations of one or more characteristics of the light output are observable in the acquired image convoluted with appropriate Gabor filters as alternating stripes in the image. The use of rolling-shutter image acquisition device for the purpose of detecting CL is described in detail in patent application WO2012/127439A1, the disclosure of which is incorporated herein by reference in its entirety. One advantage of using a rolling-shutter image acquisition device is that such image acquisition devices are simpler in design and, therefore, less costly (e.g. because less chip area is needed per pixel), than image acquisition devices that use global shutter. Another advantage is that such image acquisition devices are the devices that are at present time employed in tablets and smartphones, making these common place devices particularly suitable for implementing embodiments of the present invention.

One purpose of acquiring the one or more images of the scene in step 1040 is CL detection where the data embedded into light output of a light source is determined. Thus, the minimum number of images acquired should be such that the acquired images allow such detection. Because various detection techniques are well-known, a person skilled in the art will recognize how many images are sufficient for carrying out the detection in a given setting. The minimum number of images depends e.g. on one or more of the types and the number of the light sources, the technique used for embedding the code into the light output of the light sources, the technical characteristics of the image acquisition device used, and the detection technique employed in processing the images. For example, if a rolling shutter camera described above is used, where different portions of the image sensor(s) of the camera are exposed at different points in time, only a single image may be sufficient as the embedded code may be observable as alternating stripes in the image, as e.g. described in U.S. Pat. No. 8,248,467 B1, WO2012/127439A1, and U.S. 61/698,761. One the other hand, if a global shutter camera is used, where all portions of the image sensor(s) of the camera are exposed at the same time instances during a frame, and the embedded data are code comprise repeating sequences of S symbols, then, as described in WO2011/086501A1, at least S different images should be acquired, each image is acquired with a total exposure time comprising one or more exposure instances at different temporal positions within the repeating sequence of S symbols. Of course, more images may be acquired in step 1040 in order to e.g. improve the probability of correct determination of data embedded into the light output of various light sources or to track changes in the light contributions of the different light sources over time. The same discussion applies to the number of images acquired in step 1010, when those images are used to do, or attempt to do, CL detection.

In one embodiment, the method of FIG. 10A may end in step 1050, where, once the processing unit 220 obtains the one or more images acquired in step 1040, the processing unit 220 can process pixel values, within the images of step 1040, of at least some of the pixels 212 (first color channel) and of the pixels 214 (second color channel) to determine the data embedded into the light output of a particular CL source.

FIG. 10B illustrates a flow diagram of method steps of processing the pixel values in step 1050 of FIG. 10A according to one embodiment of the present invention.

As shown in FIG. 10B, the processing of the pixel values could start in step 1052 with the selection of pixels, from the first pixels 212 and the second pixels 214, to be used for detecting data embedded into the light output of a light source. These pixels can be selected in a manner analogous to that described above for the identification/selection of pixels within the images acquired in step 1010 which could be used for CL detection, which description is therefore not repeated here.

The method of FIG. 10B could then proceed to step 1054, where, for the pixels selected in step 1052, the processing unit 220 determines whether any of the selected pixels forming one of the color channels, e.g. the pixels forming the first color channel contain pixel values which are not suitable for CL detection. Pixel values are not suitable for CL detection if they are e.g. clipped either at the minimum or maximum value of the available pixel value range or are too close to either the minimum or maximum value of the available pixel value range to allow for detection of the entire range of intensity modulations of CL. What is "too close" is dependent on a particular method for embedding CL data into the light output of the light sources. For example, if data is embedded such that the range of intensity modulations of CL is, say, 10 pixel values, then a pixel value of 253 when the available range of pixel values is from 0 to 255 is not suitable because if that pixel value happens to be at the lower end of the range of the CL modulations, then the pixel value that should capture the intensity at the upper end of the range of the CL modulations would be 253+10=263, which would be clipped to the maximum value of the available pixel value range, i.e. to the value of 255. The processing unit 220 could determine which pixel values are not suitable as being "too close to either the minimum or maximum value of the available pixel value range" by e.g. determining whether each of these pixel values are within a predefined interval of pixel values. Thus, for the example described above where the range of intensity modulations was 10 pixel values and the available range of pixel values was 0-255, the processing unit 220 could determine that any pixel values which are outside of the range of 9-245, i.e. pixel values smaller than 9 and pixel values larger than 245, are not suitable for CL detection.

Upon positive determination in step 1054, the processing unit 220 could, in step 1056, processing the pixel values in the one or more of the acquired images of the selected pixels forming the other color channel to determine the data embedded into the light output. In this manner, pixel values of pixels which are over- or under-exposed in one color channel may be discarded and corresponding pixels values of the other channel could be used for CL detection, provided that the selected pixels forming the other color channel do not contain pixel values that are not suitable for the detection of the embedded data.

For example, if pixels to be used for CL detection are located within acquired images as indicated with the pixel values 650 (i.e., in the area of the images which, when acquired under the initial gain setting, is over-exposed) and if the gains of the first and second color channels are adjusted as described in association with FIGS. 8 and 9 and earlier figures to which these figures refer to, then, in step 1054, the processing unit 220 would determine that the pixel values 950 of the second color channel are not suitable for CL detection because they are over-exposed. The processing unit 220 would also determine that the pixel values 870 of the first color channel are, however, suitable for CL detection and would then proceed to process these pixel values to detect CL data.

In another example, alternative or additional to the example described above, if pixels to be used for CL detection are located within acquired images as indicated with the pixel values 660 (i.e., in the area of the images which, when acquired under the initial gain setting, is under-exposed) and if the gains of the first and second color channels are adjusted as described in association with FIGS. 8 and 9 and earlier figures to which these figures refer to, then, in step 1054, the processing unit 220 would determine that the pixel values 880 of the first color channel are not suitable for CL detection because they are under-exposed. The processing unit 220 would also determine that the pixel values 960 of the second color channel are, however, suitable for CL detection and would then proceed to process these pixel values to detect CL data.

In an embodiment, as described above, detection of CL could also be carried out partially based on the pixel values of the modified images from the pixels of the first color channel and partially based on the pixel values of the modified images from the pixels of the second color channel, depending on which pixel values are not clipped. Thus, for the examples described above, detection of CL in step 1056 could be carried out based on the pixel values 870 of the first color channel for the area of the acquired image of a scene corresponding to the pixel values 870 (i.e., for the bright area) and carried out based on the pixel values 960 of the second color channel for the area of the acquired image of the scene corresponding to the pixel values 960 (i.e., for the dark area).

Returning to the method illustrated in FIG. 10A, in an embodiment, the method may further include the optional step (not shown in FIG. 10A) of applying appropriate functions to the pixel values of the acquired modified images to arrive at the approximation of pixels values for the first and second color channels which would have been acquired under the initial gain setting. Such an embodiment may be particularly advantageous if the method of FIG. 10A did not include step 1010 where the images under the initial gain setting were acquired or if such images were no longer available in the system for display to a user. In this manner, in post-processing, images acquired with the gains optimized for CL detection can be compensated to obtain an approximation of images that would have been acquired with an image acquisition device with the initial gains for the different color channels, which may be desirable e.g. for aesthetic reasons. For example, images taken under an 'incorrect' white-balance of the adjusted gain setting could be corrected with complementary post-processing operation such that the appearance of a correct white-balance is again obtained, at least in approximation. The aim here would be to render an image or a video stream with restored 'correct' while-balance. As a skilled person would recognize, this generally means performing inverse gamma correction, multiplication of the images of the different color channels with a correction factor, and forward gamma correction. In general, with such an approach, color artefacts will occur, and may be visible to a human, in areas of the restored original images where one or more color channels are clipped. Such artefacts can be repaired by replacing the color with a white color for the pixels that are clipped as being over-exposed and with a black color for the pixels that are clipped as being under-exposed.

In another embodiment, the method of FIG. 10A may further include applying a reverse adjustment to the adjusted gains of the first and second color channels so that the gains of the first and second colors channels are at their initial values again (this step not shown in FIG. 10A). This embodiment may be particularly advantageous if, after CL detection has been done, the image acquisition device 210 is to be used as a conventional camera (i.e., not for CL detection).

Figure 11:
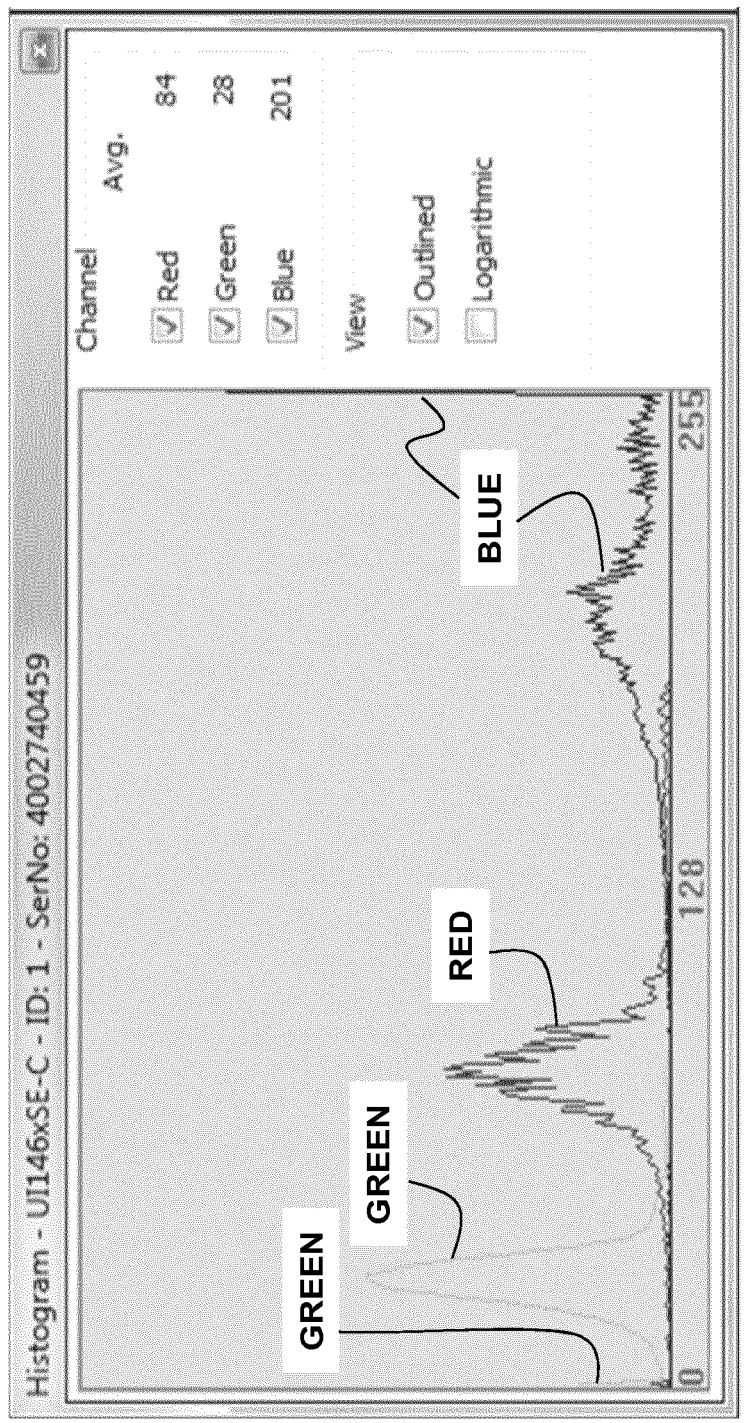
FIG. 11 illustrates histograms associated with three color channels (red, green, and blue) under the adjusted gain setting in an actual camera.

FIG. 11 illustrates histograms associated with three different color channels (red, green, and blue) under the adjusted gain setting in an actual camera. FIG. 11 is comparable to FIG. 4b described above, where FIG. 4b is an idealized theoretical view of the histograms while FIG. 11 illustrates histograms which are based on the actual experimental data.

Figure 12:
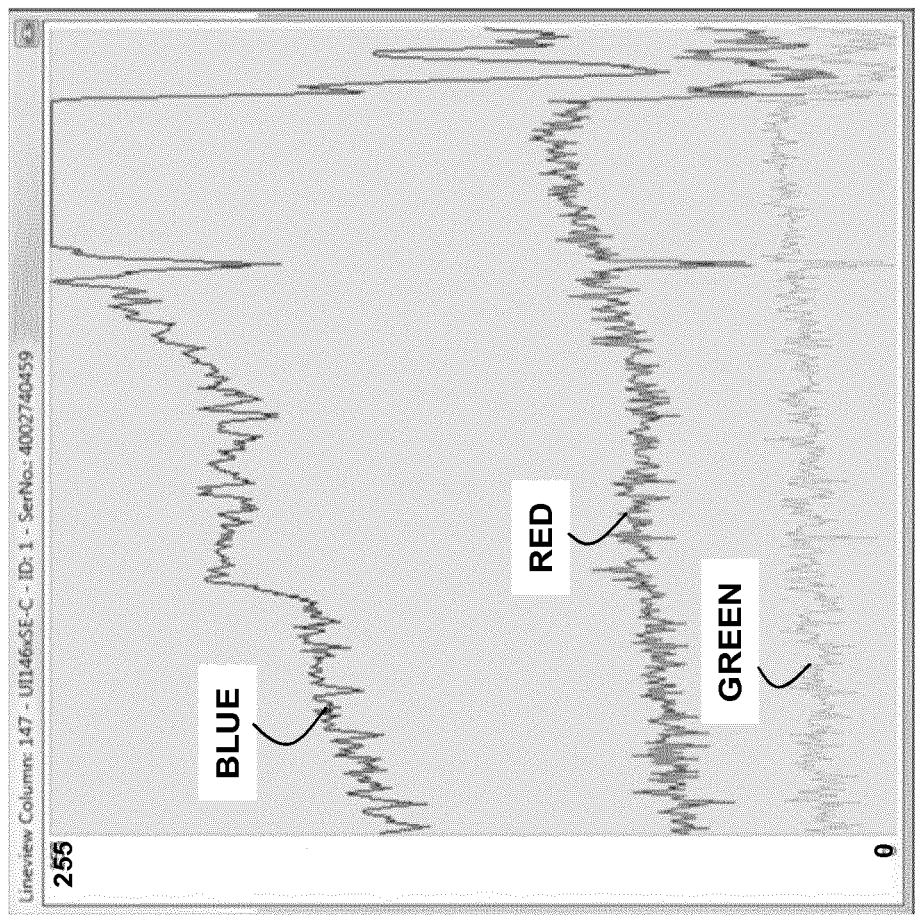
FIG. 12 illustrates pixel values, for the three color channels under the adjusted gain setting of an actual camera as shown in FIG. 11, along an exemplary line in one acquired image.

FIG. 12 illustrates pixel values, for the three color channels under the adjusted gain setting as shown in FIG. 11, along an exemplary line in one acquired image. FIG. 12 is comparable to the combined top views of FIGS. 8 and 9 described above, where the top views of FIGS. 8 and 9 are an idealized theoretical views of the pixel values along a particular line while FIG. 12 illustrates pixel values which are based on the actual experimental data.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processing unit 220 described herein.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

The invention claimed is:

1. A method for determining data embedded into a light output of a light source with an image acquisition device comprising at least a first color channel comprising a plurality of first pixels configured to detect light in a first wavelength range and a second color channel comprising a plurality of second pixels configured to detect light in a second wavelength range, the method comprising the steps of:
   adjusting an initial gain of the first color channel and/or an initial gain of the second color channel so that the distribution of a histogram of pixel values for the first color channel is substantially different from the distribution of a histogram of pixel values for the second color channel according to one or more measures of distribution;
   obtaining one or more images of a scene acquired with the image acquisition device configured with the adjusted gains for the first and second color channels, the scene containing the light output of the light source; and
   processing pixel values of at least some of the plurality of first pixels and the plurality of second pixels in the one or more of the acquired images to determine the data embedded into the light output.

2. The method according to claim 1, wherein the one or more measures of the distribution comprises a dispersion of the distribution and wherein the initial gain of the first color channel and/or the initial gain of the second color channel are adjusted so that the dispersion of the histogram of pixel values for the first color channel is substantially different from the dispersion of the histogram of pixel values for the second color channel according to one or more measures of dispersion.

3. The method according to claim 1, wherein the step of processing the pixel values to determine the data embedded into the light output comprises:
   identifying one or more areas within the one or more of the acquired images to be used for detecting the data embedded into the light output of the light source;
   selecting first pixels, from the plurality of first pixels, that correspond to the identified one or more areas, wherein each selected first pixel corresponds to a different position within the identified one or more areas;
   selecting second pixels, from the plurality of second pixels, that correspond to the identified one or more areas, wherein each selected second pixel corresponds to a different position within the identified one or more areas;
   identifying first pixels, within the selected first pixels, that contain pixel values, in the one or more of the acquired images, which are not suitable for the detection of the data embedded into the light output of the light source and, for each of the identified first pixels, identifying a second pixel, within the plurality of second pixels, that corresponds to substantially the same position within the identified one or more areas as the identified first pixel and using a pixel value of the identified second pixel while not using a pixel value of the identified first pixel for the determination of the data embedded into the light output of the light source; and/or
   identifying second pixels, within the selected second pixels, that contain pixel values, in the one or more of the acquired images, which are not suitable for the detection of the data embedded into the light output of the light source and, for each of the identified second pixels, identifying a first pixel, within the plurality of first pixels, that corresponds to substantially the same specific position within the identified one or more areas as the identified first pixel and using a pixel value of the identified first pixel while not using a pixel value of the identified second pixel for the determination of the data embedded into the light output of the light source.

4. The method according to claim 1, further comprising:
obtaining one or more images of the scene acquired with the image acquisition device configured with the initial gains for the first and second color channels; and
within the one or more images of the scene acquired with the image acquisition device configured with the initial gains for the first and second color channels, determining pixel values of pixels, from the plurality of first pixels and the plurality of second pixels to be used for detecting the data embedded into the light output of the light source,
wherein the initial gain of the first color channel and/or the initial gain of the second color channel are adjusted based on the determined pixel values.

5. The method according to claim 1, where the step of adjusting comprises decreasing a gain value of the initial gain of either the first color channel or the second color channel so that, for the color channel for which the gain value was decreased, the number of pixels that are overexposed in at least one image acquired under the initial gain decreases to be equal to or below a predefined overexposure threshold in at least one image acquired under the adjusted gain.

6. The method according to claim 1, where the step of adjusting comprises decreasing a gain value of the initial gain of either the first color channel or the second color channel so that, for the color channel for which the gain value was decreased, in at least one image acquired under the adjusted gain, there are no pixels containing pixel values above a predefined maximum value.

7. The method according to claim 1, where the step of adjusting comprises increasing a gain value of the initial gain of either the first color channel or the second color channel so that, for the color channel for which the gain value was increased, the number of pixels that are underexposed in at least one image acquired under the initial gain decreases to be equal to or below a predefined underexposure threshold in at least one image acquired under the adjusted gain.

8. The method according to claim 1, where the step of adjusting comprises increasing a gain value of the initial gain of either the first color channel or the second color channel so that, for the color channel for which the gain value was increased, in at least one image acquired under the adjusted gain, there are no pixels containing pixel values below a predefined minimum value.

9. The method according to claim 1, where the step of adjusting comprises adjusting a color-temperature setting of the image acquisition device.

10. The method according to claim 1, further comprising applying a first reverse adjustment function to pixel values of the one or more of the acquired images of the plurality of first pixels and a second reverse adjustment function to pixel values of the one or more of the acquired images of the plurality of second pixels to obtain pixels values of the one or more of the acquired images corresponding to the initial gains for the first and second color channels.

11. A computer program product comprising software code portions adapted to, when executed on a processing unit, perform the steps of the method according to claim 1.

12. A data processing system comprising at least a processor configured for performing the steps of the method according to claim 1.

13. A system for determining data embedded into a light output of a light source, the system comprising:
an image acquisition device for acquiring images, the image acquisition device comprising at least a first color channel comprising a plurality of first pixels configured to detect light in a first wavelength range and a second color channel comprising a plurality of second pixels configured to detect light in a second wavelength range; and
a processing unit for:
adjusting an initial gain of the first color channel and/or an initial gain of the second color channel so that the distribution of a histogram of pixel values for the first color channel is substantially different from the distribution of a histogram of pixel values for the second color channel according to one or more measures of distribution,
obtaining one or more images of a scene acquired with the image acquisition device configured with the adjusted gains for the first and second color channels, the scene containing the light output of the light source, and—
processing pixel values of at least some of the plurality of first pixels and the plurality of second pixels in the one or more of the acquired images to determine the data embedded into the light output.

14. The system according to claim 13, wherein the processing unit is further configured for performing the steps of the method.

15. The system according to claim 13, wherein the system is a camera, a smartphone, a tablet, or a portable electronic device.

* * * * *